US012567403B1

(12) United States Patent
Wei et al.

(10) Patent No.: US 12,567,403 B1
(45) Date of Patent: Mar. 3, 2026

(54) USING PROSODY IN SPOKEN LANGUAGE UNDERSTANDING

(71) Applicant: Amazon Technologies, Inc., Seattle, WA (US)

(72) Inventors: Kai Wei, Pittsburgh, PA (US); Martin Radfar, North York (CA); Thanh Dac Tran, Arlington, MA (US); Grant Strimel, Presto, PA (US); Nathan Anthony Susanj, York, PA (US); Athanasios Mouchtaris, Pittsburgh, PA (US); Maurizio Omologo, Altopiano della Vigolana (IT); Markus Mueller, Pittsburgh, PA (US)

(73) Assignee: Amazon Technologies, Inc., Seattle, WA (US)

( * ) Notice: Subject to any disclaimer, the term of this patent is extended or adjusted under 35 U.S.C. 154(b) by 304 days.

(21) Appl. No.: 17/708,598

(22) Filed: Mar. 30, 2022

Related U.S. Application Data

(60) Provisional application No. 63/309,801, filed on Feb. 14, 2022.

(51) Int. Cl.
| | |
|---|---|
| *G10L 15/18* | (2013.01) |
| *G06N 3/08* | (2023.01) |
| *G06Q 30/02* | (2023.01) |
| *G10L 15/02* | (2006.01) |
| *G10L 15/16* | (2006.01) |
| *G10L 15/22* | (2006.01) |
| *G10L 15/30* | (2013.01) |
| *G10L 25/78* | (2013.01) |

(52) U.S. Cl.
CPC ............ *G10L 15/1807* (2013.01); *G06N 3/08* (2013.01); *G10L 15/02* (2013.01); *G10L 15/16* (2013.01); *G10L 15/22* (2013.01); *G06Q 30/02* (2013.01); *G10L 15/30* (2013.01)

(58) Field of Classification Search
CPC ............................... G06F 13/28; G06Q 30/02
USPC .......................................................... 704/235
See application file for complete search history.

(56) References Cited

U.S. PATENT DOCUMENTS

| | | | |
|---|---|---|---|
| 6,845,356 B1 * | 1/2005 | Epstein ................... | G10L 25/78 704/235 |
| 2012/0316875 A1 * | 12/2012 | Nyquist ................. | G10L 15/30 704/235 |

FOREIGN PATENT DOCUMENTS

| | | | | |
|---|---|---|---|---|
| CN | 113051199 A * | 6/2021 | ............. | G06F 13/28 |
| WO | WO2020/227557 A1 * | 11/2020 | ............. | G10L 15/00 |
| WO | WO2021164147 A1 * | 8/2021 | ............. | G06Q 20/02 |

* cited by examiner

*Primary Examiner* — Farzad Kazeminezhad
(74) *Attorney, Agent, or Firm* — Pierce Atwood LLP

(57) ABSTRACT

Techniques for determining and using relevant prosody information for spoken language understanding (SLU) processing are described. In some embodiments, a system determines local prosody data for individual audio frames of input audio data representing a spoken input. The system also determines global prosody data based on the entire spoken input. A portion of the local prosody data is determined to be relevant for a respective audio frame. A portion of the global prosody data is determined to relevant for the spoken input. The relevant portions are used to determine at least an intent corresponding to the spoken input. Audio features corresponding to the input audio data may be used to determine relevant portions of the prosody data.

16 Claims, 12 Drawing Sheets

FIG. 1B

Dialog Act
168

Dialog Act Classifier
165

Combined Acoustic -
Prosodic Data
139

Prosody Determination
132

System(s) 120/125

Bus 1024

I/O Device Interfaces 1002

Controller(s) / Processor(s) 1004

Memory 1006

Storage 1008

Network(s) 199

FIG. 11

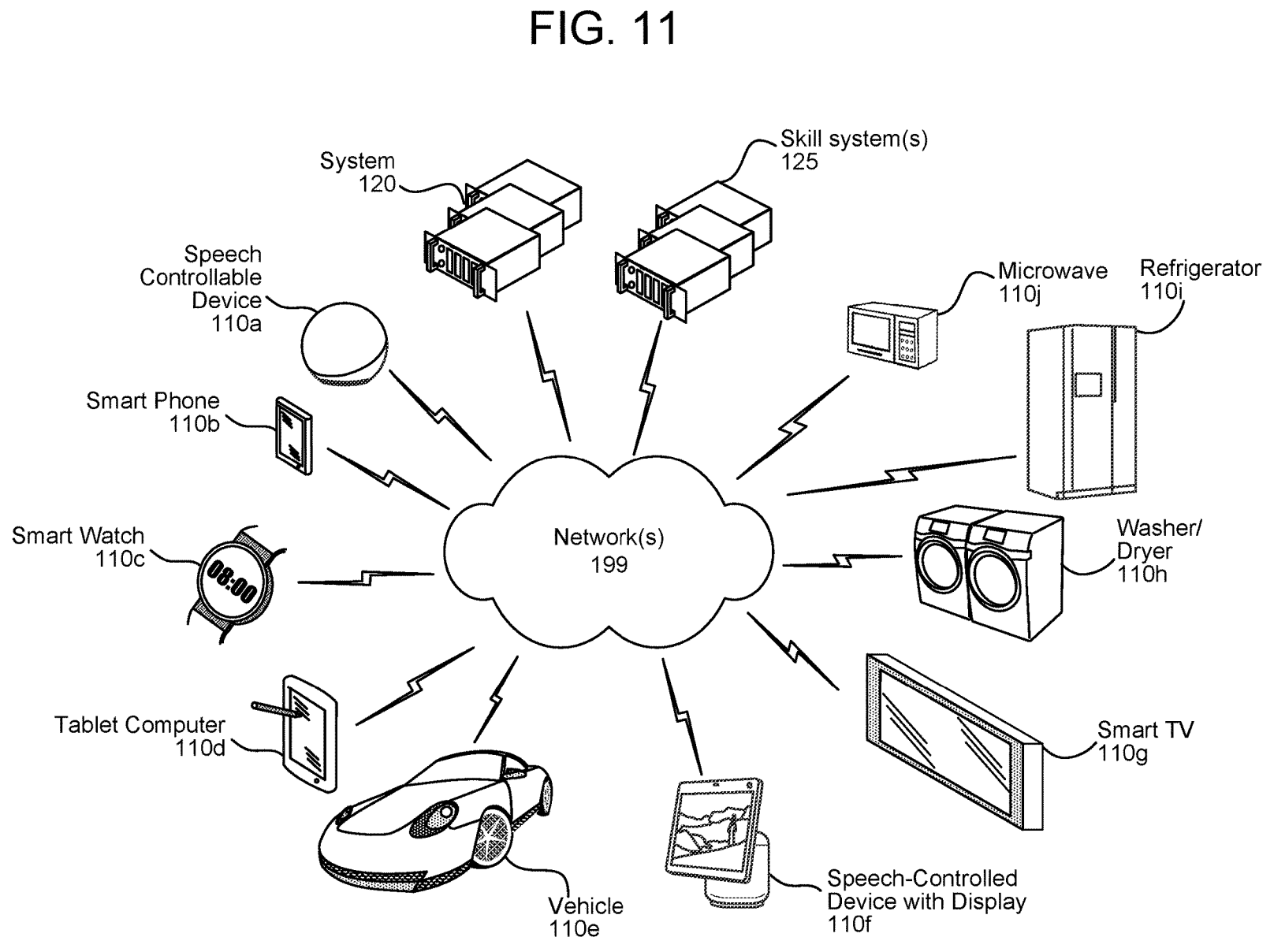

Refrigerator
110i

Microwave
110j

Washer/
Dryer
110h

Smart TV
110g

Speech-Controlled
Device with Display
110f

Skill system(s)
125

Network(s)
199

Vehicle
110e

System
120

Speech
Controllable
Device
110a

Smart Phone
110b

Smart Watch
110c

Tablet Computer
110d

USING PROSODY IN SPOKEN LANGUAGE UNDERSTANDING

CROSS REFERENCE TO RELATED APPLICATION

This application claims the benefit of priority of U.S. Provisional Patent Application No. 63/309,801 filed Feb. 14, 2022 and titled "USING PROSODY IN SPOKEN LANGUAGE UNDERSTANDING," in the names of Kai Wei, et al., the content of which is expressly incorporated herein by reference in its entirety.

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications. Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1B is a conceptual diagram illustrating an example system for using prosody data in determining a dialog act, according to embodiments of the present disclosure.

FIG. 2 is a conceptual diagram illustrating example processing performed by a prosody determination component, according to embodiments of the present disclosure.

FIG. 9 is a block diagram conceptually illustrating example components of a device, according to embodiments of the present disclosure.

FIG. 10 is a block diagram conceptually illustrating example components of a system, according to embodiments of the present disclosure.

FIG. 11 illustrates an example of a computer network for use with the overall system, according to embodiments of the present disclosure.

DETAILED DESCRIPTION

Figure 1A:
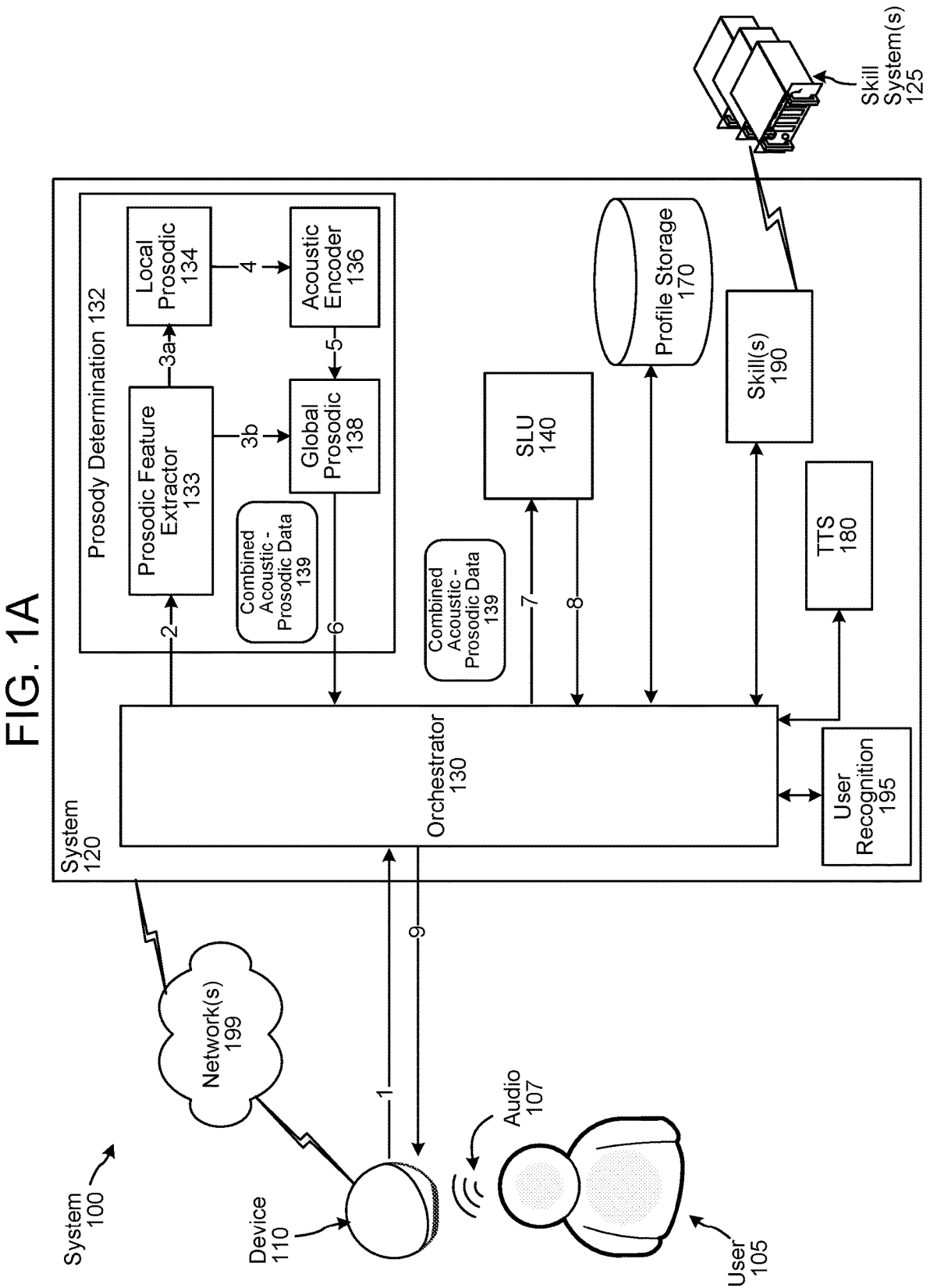
FIG. 1A is a conceptual diagram illustrating an example system for determining and using prosody data during spoken language understanding (SLU) processing, according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Spoken language understanding (SLU) involves determining meaning (e.g., intent, entities, etc.) directly from audio including speech. Text-to-speech (TTS) is a field of concerning transforming textual data into audio data that is synthesized to resemble human speech. Natural language generation (NLG) can also be used to generate human-understandable outputs representing machine representations of information. The NLG outputs can be shared with human users via TTS, displayed text, or other ways of communicating natural language content to a user.

Prosody serves a fundamental role in speech communication. It conveys the complex linguistic and semantic contents embedded in speech beyond words and their literal meanings. Incorporating prosody is believed to be important for future SLU industry applications, as users want to communicate naturally with their voice assistant systems.

To improve the naturalness of user-system interactions, offered are techniques for enabling an SLU system to use prosodic data, such as intonational, rhythmic, and tonal properties of how an utterance is spoken, when interpreting a user's intent. The system of the present disclosure improves upon SLU systems, which only use spectral audio features (e.g., STFT, or LFBE, MFCC), by additionally using prosody characteristics of speech that reflect the properties of syllables and larger units of speech.

Some SLU systems may use an ASR component to transcribe a user's spoken input to text and an NLU component to map the transcribed text to an intent. For example, when a user says "yes", the ASR component transcribes the spoken input to the correct text and the separate NLU component maps this text to a {Yes_Intent}. With respect to the foregoing example, the SLU system of the present disclosure is configured to use prosodic information to determine that the user's intent may be to agree (yes) versus to pay attention (yes?).

The present disclosure involves determining prosodic data that captures relevant prosodic acoustic cues at different levels of an utterance, and integrating the prosodic information in an SLU component to determine an intent corresponding to the utterance. As a result, the SLU system can effectively disambiguate users' intentions (yes vs. yes?) and capture indirect requests (e.g., "My office is really hot"— complain vs. request). In some embodiments, an end-to-end neural SLU system is trained to take into account this prosodic information occurring at a syllable/word level (referred to herein as "local prosodic data") and at a sentence/utterance level (referred to herein as "global prosodic data").

At the syllable/word level, the SLU system uses prosody information to disambiguate homographs (e.g. REcord vs. reCORD; PERmit vs. perMIT), as stressing on different syllables of a word can lead to different meanings. Use of prosody information can especially be helpful where intent cannot be distinguished from utterance context itself. At the sentence level, the SLU system uses overall intonational contour to characterize the speaker's intention and communicative meanings. For example, prosody information can, at the sentence/utterance level, help resolve syntactic ambiguities ("Mary knows many languages, you know." vs. "Mary knows many languages (that) you know."). In addition, the SLU system uses prosody information indicative of stress, intonation, and timing patterns to capture the speaker's intent (statement vs. question: "You want coffee." vs. "You want coffee?", confirmation vs. backchannel: "yes" vs. "yes?") and content emphasis ("I want TEA," implying not coffee, or other beverage options). The SLU system can also use prosody information at the sentence level to inform a user's satisfaction when interacting with the voice assistant system ("The book was interesting." vs. "The book was INTERESTING!"; "Yeah, sure." vs. "YEAH! SURE!").

Teachings of the present disclosure may be configured to incorporate user permissions and may only be performed if approved by a user. As such, the systems, devices, components, and techniques described herein would be typically configured to restrict processing where appropriate and only process user data in a manner that ensures compliance with all appropriate laws, regulations, standards, and the like. The teachings of the present disclosure can be implemented on a geographic basis to ensure compliance with laws in various jurisdictions and entities in which the computing components and/or user are located.

FIG. 1A is a conceptual diagram illustrating an example system 100 for determining and using prosody data when performing SLU processing. As shown in FIG. 1A, the system 100 may include a device 110, local to a user 105, connected to a system 120 across one or more networks 199. The network(s) 199 may include the Internet and/or any other wide- or local-area network, and may include wired, wireless, and/or cellular network hardware. Although the figures and discussion of the present disclosure illustrate certain steps in a particular order, the steps described may be performed in a different order (as well as certain steps removed or added) without departing from the present disclosure.

The system 120 may include multiple components to facilitate speech processing, such as, an orchestrator component 130, a prosody determination component 132, and an SLU component 140. The system 120 may further include one or more other skill components 190, which may be in communication with a skill system(s) 125 external to the system 120. The system 120 may also include, as described later herein, a profile storage 170, a TTS component 180, and a user recognition component 195 to facilitate processing of users inputs and generating outputs.

Referring to FIG. 1A, the user 105 may speak an input, and the device 110 may capture audio 107 representing the spoken user input. For example, the user 105 may say "I like photographic art" or "I like photography." The device 110 may send (step 1) audio data corresponding to the spoken input to the system 120 for processing.

The orchestrator component 130 may receive the audio data from the device 110. The orchestrator component 130 may be configured to send data to and receive data from various components of the system 120 to facilitate processing with respect to the spoken input. The orchestrator component 130 may send (step 2) the audio data corresponding to the spoken input to the prosody determination component 132.

In some cases, the user 105 may provide an input other than or in addition to the spoken input. For example, the user 105 may provide an input via a touchscreen of the device 110, a keyboard and/or mouse associated with the device 110, etc. As another example, the user 105 may provide a gesture input (e.g., thumbs up, thumbs down, head nod, etc.), which may be captured as image data by a camera(s) associated with the device 110. In such cases, the device 110 may send input data to the system 120, and the orchestrator component 130 may send the input data to one or more other components of the system 120. In some embodiments, the orchestrator component 130 may send other data (e.g., additional input(s) provided by the user 105, context information related to the user input, etc.), in addition to the audio data, to the prosody determination component 132. Below is a summary of the components of the prosody determination component 132. Further details on the various components of the prosody determination component 132 are described later in relation to FIG. 2.

A prosodic feature extractor 133, of the prosody determination component 132, may process the audio data to determine prosodic feature data representing one or more prosodic features corresponding to the audio data. The prosodic feature extractor 133 may process portions of the audio data, such as audio frames, and may determine prosodic feature data corresponding to individual audio frames of the audio data corresponding to the spoken input. The prosodic feature extractor 133 may employ one or more techniques for extracting prosodic features from audio data. Example techniques may involve use of one or more machine learning models (e.g., neural networks, encoder-decoder architecture, etc.), and may involve processing of the audio data and/or features (e.g., log mel filterbank energy features) determined from the audio data. Example prosodic features include pitch (i.e. fundamental frequency, oscillation of vocal cords), length of sounds (i.e. duration), length of pauses, loudness (i.e. volume), intonation, rhythm, stress, etc.

The prosodic feature extractor 133 may send (step 3a) the prosodic feature data to a local prosodic component 134. In some cases, the output of the prosodic feature extractor 133 may be referred to as first prosody data or local prosody data. In some embodiments, the prosodic feature extractor 133 may send (step 3b) the prosodic feature data to a global prosodic component 138 in parallel or at substantially the same time as step 3a. In some embodiments, the local prosodic component 134 may also process the audio data corresponding to the spoken input. The local prosodic component 134 may be configured to encode the prosodic feature data and "infuse" (i.e. integrate) the encoded prosodic feature data with the audio data corresponding to the spoken input. In some embodiments, the local prosodic component 134 may infuse the encoded prosodic feature data with acoustic feature data extracted from the audio data. The acoustic feature data may be determined from individual audio frames, and may be infused with the prosodic feature data corresponding to the respective audio frames. The output of the local prosodic component 134 may be referred to as local acoustic embedding data, which may include a set of embeddings corresponding to individual audio frames.

The local prosodic component 134 may send (step 4) the local acoustic embedding data to an acoustic encoder 136. The acoustic encoder 136 may process the local acoustic embedding data to determine global acoustic embedding data. The acoustic encoder 136 may employ a bidirectional LSTM acoustic encoder to learn audio representations, which may be outputted as the global acoustic embedding data.

The acoustic encoder 136 may send (step 5) the global acoustic embedding data to the global prosodic component 138. The global prosodic component 138 may process the global acoustic embedding data and the prosodic feature data (from the prosodic feature extractor 133) to determine combined acoustic-prosodic data 139. The global prosodic component 138 may encode the prosodic features corresponding to the entire audio data/spoken input, and infuse (i.e. integrate) them with the global acoustic embedding data. The combined acoustic-prosodic data 139 may be a data vector, data matrix, etc. as described in detail below with respect to FIG. 2.

The global prosodic component 138 may send (step 6) the combined acoustic-prosodic data 139 to the orchestrator component 130, and the orchestrator component 130 may send (step 7) the combined acoustic-prosodic data 139 to the SLU component 140. The orchestrator component 130, in some embodiments, may also send the audio data corresponding to the spoken input to the SLU component 140.

The SLU component 140 may process the audio data and the combined acoustic-prosodic data 139 to determine NLU data (e.g., intent data, entity data, domain, etc.) corresponding to the words spoken by the user 105. The NLU data may include one or more NLU hypotheses, each including an intent, one or more entities and entity types (if applicable), a domain, and a corresponding score (representing a confidence of the SLU component 140 in generating the NLU hypothesis). The SLU component 140 may use the combined acoustic-prosodic data 139 to apply "attention" to portions of the audio data to determine NLU data that may be more accurate based on the prosodic features extracted from the audio data. For example, the SLU component 140, using respective prosodic features, may determine that the spoken input "Really?" corresponds to a {QuestionIntent}, and may determine that the spoken input "Really!!" corresponds to a {AgreementIntent}. As another example, the SLU component 140, using respective prosodic features, may determine that the spoken input "I like photographic (photoGRAphic) art" represents the user's fondness for photographic artwork, and may determine that the spoken input "I like photography (phoTOgraphy)" represents the user's fondness for taking photos (capitalization of certain letters represents prosodic stress, emphasis, etc. that may be indicated by the user in saying the word). Moreover, the SLU component 140 may use the combined acoustic-prosodic data 139 to correctly interpret when the user says "photographic" versus the user says "photography" based on the prosodic features representing stress on different syllables of similar words. As yet another example, the SLU component 140, using respective prosodic features, may determine that the spoken input "I need a REcord" represents a user's intent to purchase or obtain a record (noun), and may determine that the spoken input "I need to reCORD" represents a user's intent to record (verb) like audio, video, etc.

The SLU component 140 may be equivalent to a combination of an ASR component and a NLU component. Yet, the SLU component 140 may process audio data and directly determine the NLU data, without an intermediate step of generating a transcription (e.g., ASR output data). As such, the SLU component 140 may take audio data representing a spoken natural language input and attempt to make a semantic interpretation of the spoken natural language input. That is, the SLU component 140 may determine a meaning associated with the spoken natural language input and then implement that meaning. For example, the SLU component 140 may interpret audio data representing a spoken natural language input in order to derive a desired action. The SLU component 140 may output a most likely NLU hypothesis, or multiple NLU hypotheses associated with respective confidence or other scores (such as probability scores, etc.). Details on how an example SLU component 140 may process are described below in relation to FIGS. 5-7.

The SLU component 140 may send (step 8) the NLU data to the orchestrator component 130. The orchestrator component 130 may send data to one or more other components, such as, the skill component 190, the TTS component 180, the user recognition component 195, the profile storage 170, etc.

The skill component 190 may operate in conjunction between the system 120 and other devices, such as the device 110, a restaurant electronic ordering system, a taxi electronic booking system, etc. in order to complete certain functions. Inputs to a skill component 190 may come from speech processing interactions or through other interactions or input sources.

A skill component 190 may be associated with a domain, a non-limiting list of which includes a smart home domain, a music domain, a video domain, a weather domain, a communications domain, a flash briefing domain, a shopping domain, and a custom domain. A "domain" may include various skills relating to a particular area of interest. For example, a music domain may include various skills that can respond to a user's request to play music, enable a user to purchase music, etc. Such skills may be the Amazon Music skill, the Pandora skill, the Spotify skill, etc. In another example, a smart-home domain may include skills that enable a user to control various home devices.

The skill component 190 may send output data responsive to the user input to the orchestrator component 130. The system 120 may include the TTS component 180 that generates audio data including synthesized speech. The data input to the TTS component 180 may come from a skill component 190, the orchestrator component 130, or another component of the system 120.

In one method of synthesis called unit selection, the TTS component 180 matches input data against a database of recorded speech. The TTS component 180 selects matching units of recorded speech and concatenates the units together to form audio data. In another method of synthesis called parametric synthesis, the TTS component 180 varies parameters such as frequency, volume, and noise to determine audio data including an artificial speech waveform. Parametric synthesis uses a computerized voice generator, sometimes called a vocoder.

In some cases, the orchestrator component 130 may send the output data from the skill component 190 to the TTS component 180. The TTS component 180 may send output audio data to the orchestrator component 130, where the output audio data represents synthesized speech corresponding to the output data from the skill component 190.

In some cases, the orchestrator component 130 may send (step 9) the output data from the skill component 190 and/or the output audio data from the TTS component 180 to the device 110 for presenting to the user 105. The output data may include text, icons, images, graphics, or other type of data. The output presented to the user 105 via the device 110 may be visual and/or audible. Alternatively or additionally, the system 120 may send output data to another device 110, associated with the user 105.

As shown in FIG. 1A, the system 120 may include the user recognition component 195. The user recognition component 195 may recognize one or more users using various data. The user recognition component 195 may take as input the audio data corresponding to the user input (received in step 1). The user recognition component 195 may perform user recognition by comparing speech characteristics, in the audio data, to stored speech characteristics of users. The user recognition component 195 may additionally or alternatively perform user recognition by comparing biometric data (e.g., fingerprint data, iris data, retina data, etc.), received by the system 120 in correlation with a natural language input, to stored biometric data of users. The user recognition component 195 may additionally or alternatively perform user recognition by comparing image data (e.g., including a representation of at least a feature of a user), received by the system 120 in correlation with a natural language input, with stored image data including representations of features of different users. The user recognition component 195 may perform other or additional user recognition processes, including those known in the art. For a particular natural language input, the user recognition component 195 may perform processing with respect to stored data of users associated with the device 110 that received the natural language input.

The user recognition component 195 determines whether a natural language input originated from a particular user. For example, the user recognition component 195 may determine a first value representing a likelihood that a natural language input originated from a first user, a second value representing a likelihood that the natural language input originated from a second user, etc. The user recognition component 195 may also determine an overall confidence regarding the accuracy of user recognition processing.

The user recognition component 195 may output a single user identifier corresponding to the most likely user that originated the natural language input. Alternatively, the user recognition component 195 may output multiple user identifiers (e.g., in the form of an N-best list) with respective values representing likelihoods of respective users originating the natural language input. The output of the user recognition component 195 may be used to inform NLU processing, processing performed by a skill 125, as well as processing performed by other components of the system 120 and/or other systems.

The system 120 may include profile storage 170. The profile storage 170 may include a variety of data related to individual users, groups of users, devices, etc. that interact with the system 120. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; skill enablement data; and/or other data.

The profile storage 170 may include one or more user profiles. Each user profile may be associated with a different user identifier. Each user profile may include various user identifying data (e.g., name, gender, address, language(s), etc.). Each user profile may also include preferences of the user. Each user profile may include one or more device identifiers, each representing a respective device registered to the user. Each user profile may include skill identifiers of skills 125 that the user has enabled. When a user enables a skill 125, the user is providing the system 120 with permission to allow the skill 125 to execute with respect to the user's natural language inputs. If a user does not enable a skill 125, the system 120 may not execute the skill 125 with respect to the user's natural language inputs.

The profile storage 170 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may be associated with (or include) one or more device profiles corresponding to one or more devices associated with the group profile.

The profile storage 170 may include one or more device profiles. Each device profile may be associated with a different device identifier. A device profile may include various device identifying data, input/output characteristics, networking characteristics, etc. A device profile may also include one or more user identifiers, corresponding to one or more user profiles associated with the device profile. For example, a household device's profile may include the user identifiers of users of the household.

In some embodiments, instead of the SLU component 140, the system 120 may include an ASR component and an NLU component. The ASR component transcribes the audio data into ASR output data including one or more ASR hypotheses. An ASR hypothesis may be configured as a textual interpretation of the speech in the audio data, or may be configured in another manner, such as one or more tokens. Each ASR hypothesis may represent a different likely interpretation of the speech in the audio data. Each ASR hypothesis may be associated with a score (e.g., confidence score, probability score, or the like) representing the associated ASR hypothesis correctly represents the speech in the audio data.

The ASR component interprets the speech in the audio data based on a similarity between the audio data and pre-established language models. For example, the ASR component may compare the audio data with models for sounds (e.g., subword units, such as phonemes, etc.) and sequences of sounds to identify words that match the sequence of sounds of the speech represented in the audio data. In some embodiments, the ASR component may use the combined acoustic-prosodic data 139 to determine the ASR data corresponding to the spoken input. The ASR component may send the ASR data to the orchestrator component 130.

In at least some instances, instead of the device 110 receiving a spoken natural language input, the device 110 may receive a textual (e.g., typed) natural language input. The device 110 may determine text data representing the textual natural language input, and may send the text data to the system 120, wherein the text data is received by the orchestrator component 130.

The orchestrator component 130 may send the ASR data, depending on the type of natural language input received, to the NLU component. The NLU component may process the ASR data to determine NLU data (e.g., intent data, entity data, domain data, one or more NLU hypotheses including an intent, one or more entities, and corresponding confidence score) corresponding to the user input provided by the user 105. In some embodiments, the NLU component may use the combined acoustic-prosodic data 139 to determine the NLU data corresponding to the spoken input.

The NLU component may perform intent classification (IC) processing on the ASR data to determine an intent of the natural language input. An intent corresponds to an action to be performed that is responsive to the natural language input. To perform IC processing, the NLU component may communicate with a database of words linked to intents. For example, a music intent database may link words and phrases such as "quiet," "volume off," and "mute" to a <Mute> intent. The NLU component identifies intents by comparing words and phrases in ASR output data or text data to the words and phrases in an intents database. In some embodiments, the NLU component may communicate with multiple intents databases, with each intents database corresponding to one or more intents associated with a particular skill.

For example, IC processing of the natural language input "play my workout playlist" may determine an intent of <PlayMusic>. For further example, IC processing of the natural language input "call mom" may determine an intent of <Call>. In another example, IC processing of the natural language input "call mom using video" may determine an intent of <VideoCall>. In yet another example, IC processing of the natural language input "what is today's weather" may determine an intent of <OutputWeather>.

The NLU component may also perform named entity recognition (NER) processing on the ASR data or text data to determine one or more portions, sometimes referred to as slots, of the natural language input that may be needed for post-NLU processing (e.g., processing performed by a skill). For example, NER processing of the natural language input "play [song name]" may determine an entity type of "SongName" and an entity value corresponding to the indicated song name. For further example, NER processing of the natural language input "call mom" may determine an entity type of "Recipient" and an entity value corresponding to "mom." In another example, NER processing of the natural language input "what is today's weather" may determine an entity type of "Date" and an entity value of "today."

In at least some embodiments, the intents identifiable by the NLU component may be linked to one or more grammar frameworks with entity types to be populated with entity values. Each entity type of a grammar framework corresponds to a portion of ASR output data that the NLU component believes corresponds to an entity value. For example, a grammar framework corresponding to a <PlayMusic> intent may correspond to sentence structures such as "Play {Artist Name}," "Play {Album Name}," "Play {Song name}," "Play {Song name} by {Artist Name}," etc.

For example, the NLU component may perform NER processing to identify words in ASR output data or text data as subject, object, verb, preposition, etc. based on grammar rules and/or models. Then, the NLU component may perform IC processing using the identified verb to identify an intent. Thereafter, the NLU component may again perform NER processing to determine a grammar model associated with the identified intent. For example, a grammar model for a <PlayMusic> intent may specify a list of entity types applicable to play the identified "object" and any object modifier (e.g., a prepositional phrase), such as {Artist Name}, {Album Name}, {Song name}, etc. The NER processing may then involve searching corresponding fields in a lexicon, attempting to match words and phrases in the ASR output data that NER processing previously tagged as a grammatical object or object modifier with those identified in the lexicon.

NER processing may include semantic tagging, which is the labeling of a word or combination of words according to their type/semantic meaning. NER processing may include parsing ASR output data or text data using heuristic grammar rules, or a model may be constructed using techniques such as hidden Markov models, maximum entropy models, log linear models, conditional random fields (CRFs), and the like. For example, NER processing with respect to a music skill may include parsing and tagging ASR output data or text data corresponding to "play mother's little helper by the rolling stones" as {Verb}: "Play," {Object}: "mother's little helper," {Object Preposition}: "by," and {Object Modifier}: "the rolling stones." The NER processing may identify "Play" as a verb based on a word database associated with the music skill, which IC processing determines corresponds to a <PlayMusic> intent.

The NLU component may generate NLU data including one or more NLU hypotheses, with each NLU hypothesis including an intent and optionally one or more entity types and corresponding entity values. In some embodiments, the NLU component may perform IC processing and NER processing with respect to different skills. One skill may support the same or different intents than another skill. Thus, the NLU output data may include multiple NLU hypotheses, with each NLU hypothesis corresponding to IC processing and NER processing performed on the ASR data or text data with respect to a different skill.

The NLU component may send the NLU data corresponding to the user input to the orchestrator component 130. The orchestrator component 130 may invoke the skill component 190 by sending the NLU data to the skill component 190. One or more skill components 190 may communicate with one or more skill systems 125. A "skill" may refer to software, that may be placed on a machine or a virtual machine (e.g., software that may be launched in a virtual instance when called), configured to perform one or more actions in response to user inputs processed by the NLU component.

Prosodic features such as energy and pitch have been shown to be useful for understanding a user's intent. The present disclosure describes neural network-based approaches to integrate prosodic features into SLU processing, which infers intents, entities, etc. directly from audio signals. Some embodiments use a learnable component, like a gating mechanism that assesses the importance of prosodic features, derived from audio signals, and selectively retains core information helpful to SLU processing.

Figure 1B:
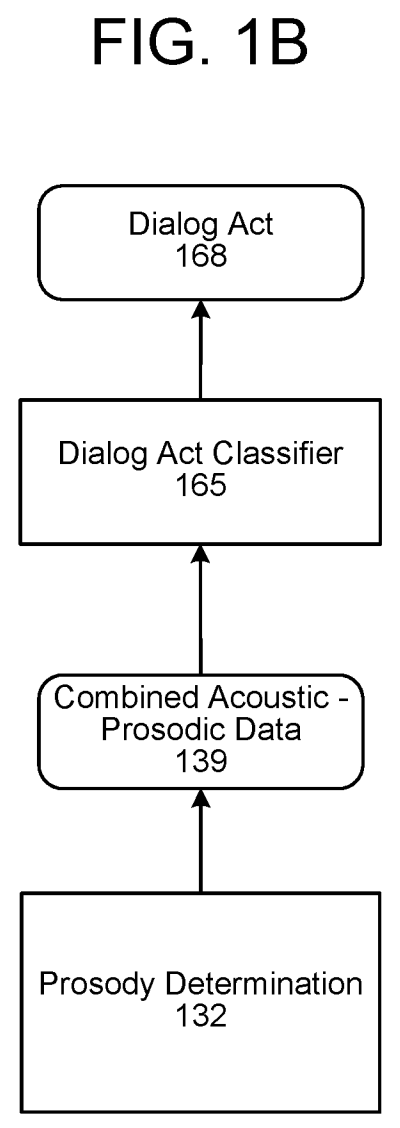

FIG. 1B is a conceptual diagram illustrating an example system for using prosody data in determining a dialog act, according to embodiments of the present disclosure. Dialog processing, as used herein, is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems often need to recognize, retain, and use information collected during more than one input during a back-and-forth or "multi-turn" interaction with the user.

The system 100 may be configured to respond to the user across multiple exchanges between the user and the system. For example, the user may say to the system "Order some apples" and the system may respond "what type of apples would you like?" The user may respond "Fuji" and the system may respond "how many Fuji apples do you want?" to which the user may say "Three." Such exchanges may be part of an ongoing conversation between the system and a user, which may be referred to as a dialog. As used herein, a "dialog," "dialog session," "session," or the like refers to various related user inputs and system outputs, for example inputs and outputs related to an ongoing exchange between a user and the system.

A dialog may be goal-oriented, meaning the dialog is directed to the system performing a specific action requested by a user (such as purchasing an item). Alternatively, a dialog may not be goal-oriented, for example as part of a freeform conversation between the system and a user that may not have a definite end point or action in mind at the end of the conversation. System components that control what actions the system takes in response to various user inputs of a dialog may sometimes be referred to as chatbots.

A user input and performance by the system of a corresponding action, responsive to the user input, may be referred to as a dialog "turn." A session identifier may be associated with multiple related turns corresponding to consecutive related user inputs. One user input may be considered related to a subsequent user input, thereby causing a single session identifier to be associated with both user inputs, based on, for example, a length of time between receipt of the first user input and receipt of the subsequent user input and/or a length of time between performance of an action responsive to the first user input and receipt of the subsequent user input.

Systems configured to engage in dialogs with a user may use the session identifier or other data to track the progress of the dialog to select system responses in a way that tracks the previous user-system exchanges, thus moving the dialog along in a manner that results in a desirable user experience.

Referring to FIG. 1B, dialogue acts (DAs), as used herein, refer to speech inputs that represent intentions behind a user's request to achieve a conversational goal. A dialogue act classifier (DAC) 165 may include one or more machine learning models configured to identify speech units such as statement, question, backchannel, and agreement, corresponding to a spoken input. The DAC 165 may also be configured to identify an action requested by the user, for example, play music, add to list, find location, book restaurant reservation, etc. The DAC 165 may output a dialog act 168 based on processing the combined acoustic-prosodic data 139 corresponding to a spoken input. For example, when the user 105 says "yes", the DAC 165 may be used to determine whether the user's intent is to agree with the voice assistant system's response (DA: {agreement}) or to signal that the user is paying attention to the system (DA: {backchannel}). Depending on system/model configuration, the DAC 165 may be configured to identify additional dialog acts.

In some embodiments, the DAC 165 may include a max pooling layer followed by a dense layer, finally followed by a softmax layer. For input audio data X and representing the combined acoustic-prosodic data 139 as representation vector f, the DAC 165 may produce a dialog act distribution over all the dialog acts D that the DAC 165 is configured to predict. The cross entropy loss for the input audio data X may be defined as:

$$\hat{y}_X^{diag} = \text{softmax}\left(W^f f + b_f\right)$$

$$\mathcal{L}_X = -\sum_{d=1}^{D} y_{X,d}^{diag} \log(\hat{y}_{X,d}^{diag})$$

At the syllable/word level, stressing on different syllables of a word can lead to different meanings (e.g., REcord vs. reCORD). At the sentence level, overall intonational contour contributes to characterize speaker's intention and communicative meanings (e.g., agreement vs. backchannel: yes vs. yes?). Some techniques found that the location of the maximum frequency occurrence can effectively distinguish between questions and statements. Other techniques also show that a pitch contour rises on the second syllable of words, such as "okay", can mark a topic shift as well as conveying affirmation or a backchannel. Neural network is one technique to encode prosodic features. For example, convolutional neural networks may be used to model sentence-level prosodic features. The present disclosure describes neural approaches that fuse prosodic and spectral characteristics of audio signals at both syllable/word level and sentence level.

In some embodiments, the DAC 165 may be included in the system 120 as an additional component, and the dialog act 168 may be provided as additional data to other components of the system 120. The dialog act 168 may be sent to the skill component 190 so the skill component 190 may determine output data responsive to the spoken input based on the corresponding dialog act. For example, the skill component 190 may determine first output data responsive to the spoken input "yes" corresponding to the dialog act 168 {DA: agreement}, while the skill component 190 may determine second output data (different than the first output data) responsive to the spoken input "yes" corresponding to the dialog act 168 {DA: question}.

Figure 2:
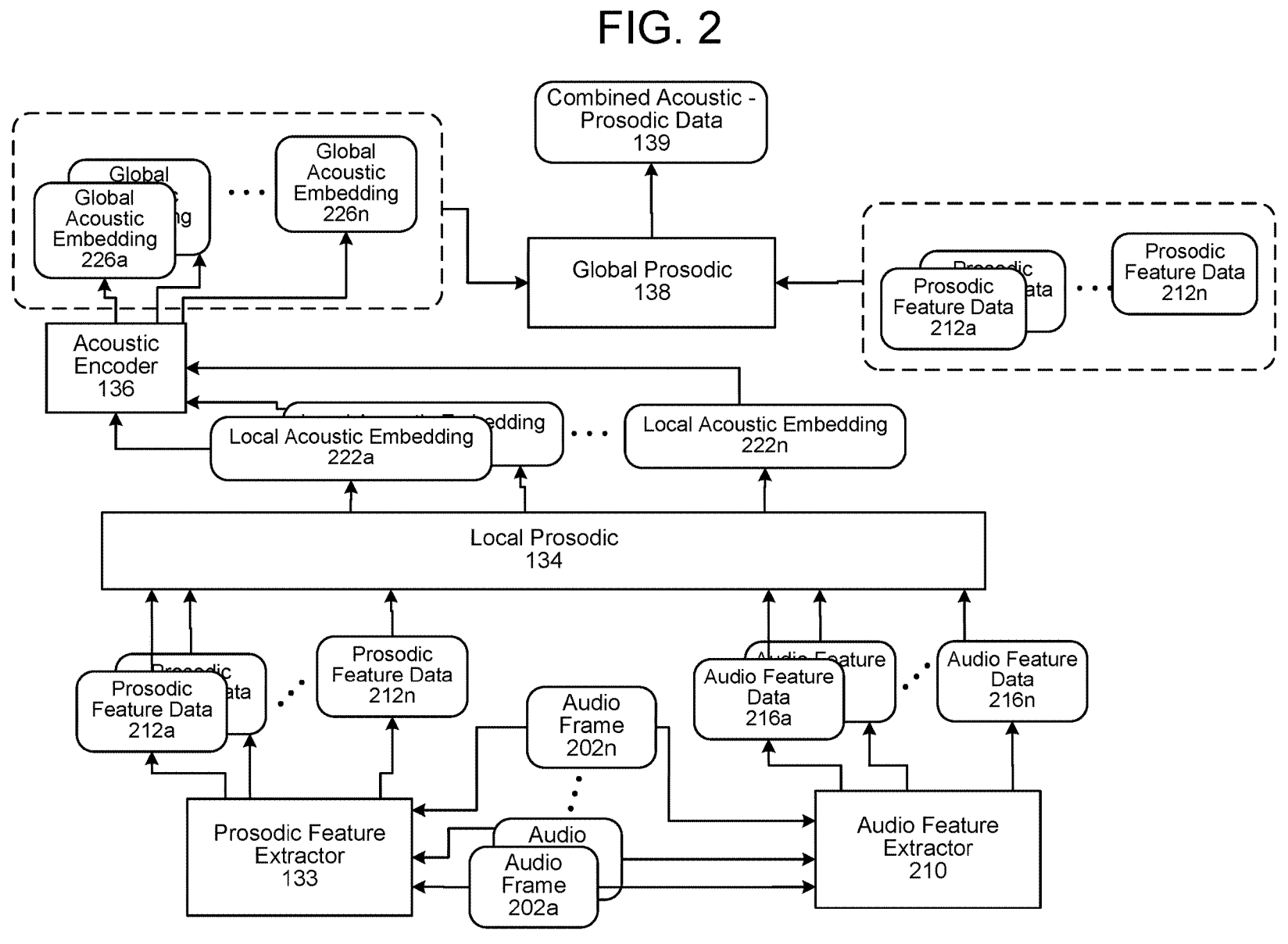

FIG. 2 is a conceptual diagram illustrating example processing performed by the prosody determination component 132. As described in relation to FIG. 1A, the prosody determination component 132 may include the prosodic feature extractor 133, the local prosodic component 134, the acoustic encoder 136, and the global prosodic component 138. The prosody determination component 132 may further include an audio feature extractor 210. In other embodiments, the audio feature extractor 210 may be implemented outside of the prosody determination component 132, and audio feature data 216, determined by the audio feature extractor 210, may be provided to the prosody determination component 132 for processing.

The prosody determination component 132 may process individual audio frames 202a-202n of audio data corresponding to a spoken input. The audio frames 202 may be determined using windowing functions on the audio data. The size of each audio frame may depend upon implementation. In an example, each frame may include twenty-five (25) milliseconds of audio data, with an overlap of the next frame of 10 milliseconds of data, thus resulting in sliding window processing of audio data. Performing a windowing function may include multiplying a time record by a finite-length window with an amplitude that varies smoothly and gradually toward zero at its edges. By performing such, the endpoints of the waveforms of respective frames of audio data meet, resulting in a continuous waveform without sharp transitions.

The input to the prosody determination component 132 may be a sequence of raw audio with t time frames, $X=\{x_1, x_2, \ldots, x_t\}$. Each x (audio frame 202) may be converted to the logarithm of mel-scale filter bank energy (LFBE) features $L=\{l_1, l_2, \ldots, l_n\}$, by the audio feature extractor 210, and prosodic features $P=\{(e_1, c_1), \ldots, (e_t, c_t)\}$, by the prosodic feature extractor 133, where $e_i \in \mathcal{R}^{|e_i|}$ and $c_i \in \mathcal{R}^{|c_i|}$ denote energy and pitch features, respectively.

The audio feature extractor 210 may use one or more techniques (e.g., windowing function to determine audio frames, an algorithm to compute the features, etc.) to determine LFBE features from the audio frame 202. In other embodiments, the audio feature extractor 210 may determine other acoustic features (e.g., MFCCs) from the audio frames 202. The audio feature extractor 210 may output audio feature data 216, where the audio feature data 216a may correspond to the audio frame 202a, the audio feature data 216b may correspond to the audio frame 202b, and so on.

The prosodic feature extractor 133 may extract at least two types of prosodic features-energy and pitch. The description and figures focus on energy and pitch features, however, it should be understood that other prosodic features may also be extracted and used in a similar manner as described herein.

With respect to energy features, for each audio frame $x_i \in X$, the prosodic feature extractor 133 may compute the 3-dimensional energy features $e_i$ from the 40-mel frequency filter-bank. These features may be (i) the log of total energy normalized by dividing the maximum total energy of the utterance; (ii) the log of total energy in the lower 20 mel-frequency bands, normalized by total energy; and (iii) the log of total energy in the higher 20 mel-frequency bands, normalized by total energy. Other techniques to determine energy features may be used.

With respect to pitch features, for each audio frame $x_i \in X$, the prosodic feature extractor 133 may compute the 3-dimensional pitch features $c_i$ as (i) the warped Normalized Cross Correlation Function (NCCF), (ii) log-pitch with Probability of Voicing (POV)-weighted mean subtraction over a 1.5-second window, and (iii) the estimated derivative of the raw log pitch. Other techniques to determine pitch features may be used.

The prosodic feature extractor 133 may concatenate the energy features $e_i$ and the pitch features $c_i$ for each audio frame 202. Then, the prosodic feature extractor 133 may transform the concatenated features $e_i$ and $c_i$ using the linear projection $W^{ec}$ with the ReLU activation function as represented in Equation 1.

$$p_i=\text{ReLU}(W^{ec}[e_i,c_i]) \qquad \text{Equation (1)}$$

The prosodic feature extractor 133 may output prosodic feature data 212 representing $P=\{p_1, p_2, \ldots, p_t\}$ as a stack of t local prosodic embeddings corresponding to t audio frames 202 of the input audio data, with each $p_i \in P$ computed according to Eq. (1). Prosodic feature data 212a may represent prosodic embedding data for the audio frame 202a, prosodic feature data 212b may represent prosodic embedding data for the audio frame 202b, and so on.

Figure 3:
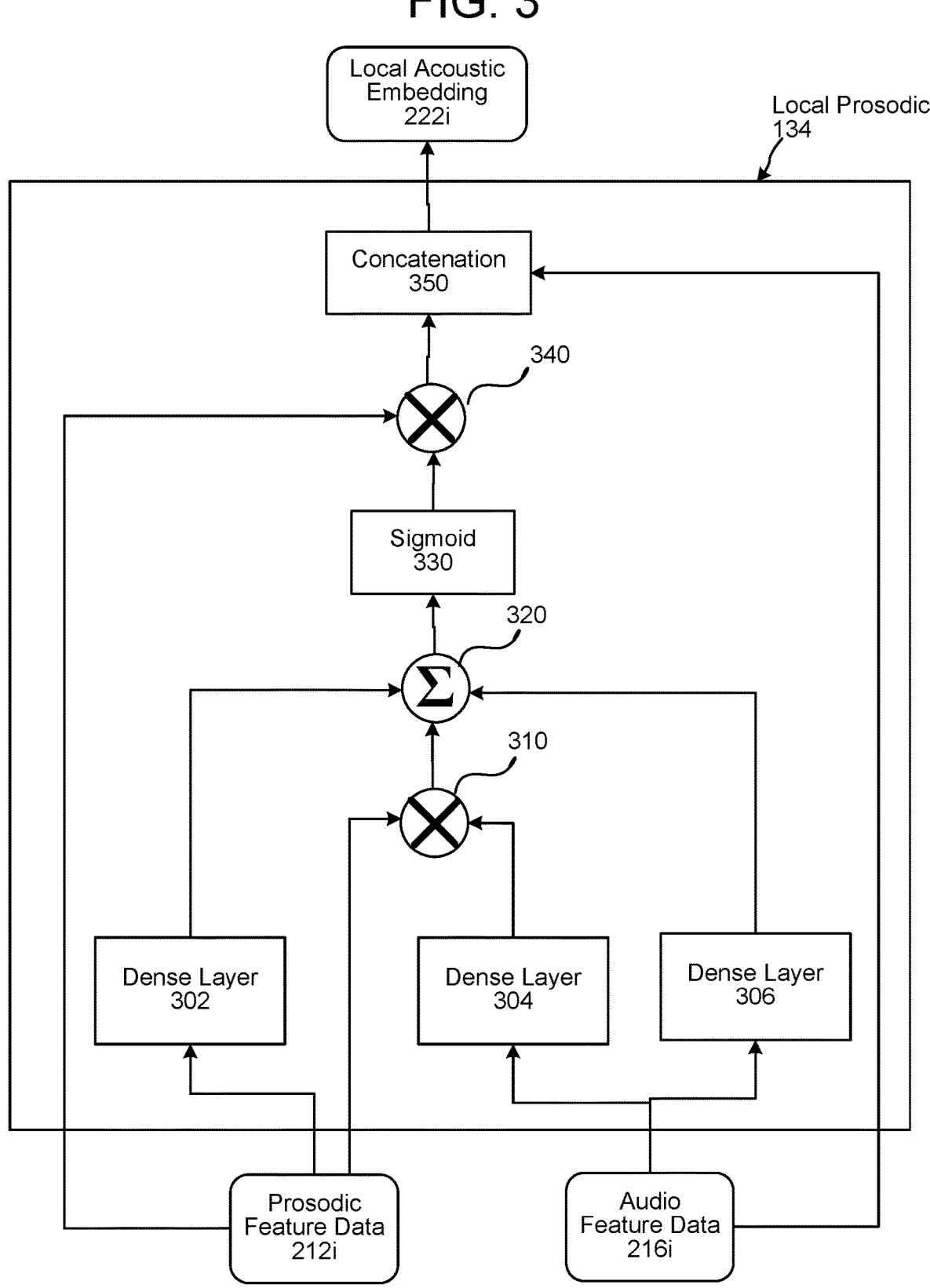
FIG. 3 is a conceptual diagram illustrating example processing performed by a local prosodic component, according to embodiments of the present disclosure.

The local prosodic component 134 may process the prosodic feature data 212 and the audio feature data 216. FIG. 3 is a conceptual diagram illustrating processing that may be performed by the local prosodic component 134. High tone/energy sounds can appear in a few segments of the whole input audio. However, these sounds cannot contribute equally to input audio or to SLU processing. The local prosodic component 134 may selectively combine each prosodic feature data 212i ($p_i$ in Eq. (1)) with audio feature data 216i ($l_i$) for each audio frame 202i ($x_i$). The local prosodic component 134 provides a mechanism to allow the model to incorporate prosodic features when needed.

The local prosodic component 134 may take as input the prosodic feature data 212 (the stack $P=\{p_1, p_2, \ldots, p_t\}$) and the audio feature data 216 (the stack $L=\{l_1, l_2, \ldots, l_t\}$). A dense layer 302 may use a learnable parameter, denoted as $W^p$, and may process and transform the prosodic feature data 212i. A dense layer 304 may use a learnable parameter, denoted as $W^{lp}$, and may process and transform the audio feature data 216i. A dense layer 306 may use a learnable parameter, denoted as $W^l$, and may process and transform the audio feature data 216i.

The local prosodic component 134 may compute a gating score $\beta_i$ from the transformed prosodic feature data ($p_i$) outputted by the dense layer 302, the transformed audio feature data ($l_i$) outputted by the dense layer 306, and the interactive features between $p_i$ and $l_i$ outputted by the dense layer 304. The local prosodic component 134 may use a summation component 320 configured to combine: (e.g., add, sum, etc.) (i) the transformed prosodic feature data outputted by the dense layer 302, (ii) the transformed audio feature data outputted by the dense layer 306 and (iii) their element-wise product features outputted by the component 310.

The gating score may be computed as follows:

$$\beta_i=\sigma(W^p p_i+W^l l_i+W^{lp} l_i \otimes p_i) \qquad \text{Equation (2)}$$

where $\sigma$ is the sigmoid function 330, $\otimes$ is the element-wise product operator 310, and + is the summation (aggregation) operator 320. The gating score $\beta_i$ may be the output of the sigmoid function 330.

The local prosodic component 134 may use an element-wise product operator 340 $\otimes$ to combine the gating score $\beta_i$ with the prosodic feature data 212i to determine at least a portion or all of the prosodic feature data 212i that is relevant for SLU processing on a syllable/word level (referred to herein as relevant local prosodic feature data). The local prosodic component 134 may then use a concatenation component 350 to concatenate the relevant local prosodic feature data with the audio feature data 216i to generate the local acoustic embedding data 222i.

The local prosodic component 134 may output local acoustic embedding data 222, which may be a stack $A=\{a_1, a_2, \ldots, a_t\}$ of local acoustic embeddings, where $a_i$ is computed as follows:

$$\alpha_i=[\beta_i \otimes p_i;l_i] \qquad \text{Equation (3)}$$

According to Eqs. (2) and (3), when the gating score $\beta_i$ approaches 1, $a_i$ (the local acoustic embedding data 222i) becomes a simple concatenation between $p_i$ (the prosodic feature data 212i) and $l_i$ (the audio feature data 216i), thus, indicating that most of the prosodic feature data 212i is relevant for SLU processing at the syllable/word level. In contrast, when gating score $\beta_i$ approaches 0, $a_i$ (the local acoustic embedding data 222i) ignores prosodic signals $p_i$ (the prosodic feature data 212i) and only uses $l_i$ (the audio feature data 216i), thus, indicating that almost none of the prosodic feature data 212i is relevant for SLU processing at the syllable/word level. In this manner, the local prosodic component 134 provides a flexible mechanism to effectively fuse/combine prosodic feature data 212 and audio feature data 216.

In other embodiments, the gating score $\beta_i$ may be used to perform thresholding, where prosodic feature data 212a corresponding to a gating score $\beta_a$ that does not satisfy a condition (e.g., may be below a threshold value or may exceed a threshold value depending on system configuration) may not be integrated with the corresponding audio feature data 216a.

Referring again to FIG. 2, the local acoustic embedding data 222 outputted by the local prosodic component 134 may be processed by the acoustic encoder 136. The local acoustic embedding data 222a may represent a fusion between the prosodic feature data 212a and the audio feature data 216a corresponding to the audio frame 202a, the local acoustic embedding data 222b may represent a fusion between the prosodic feature data 212b and the audio feature data 216b corresponding to the audio frame 202b, and so on.

The acoustic encoder 136 may process the local acoustic embedding data 222 to produce global acoustic embedding data 226. For example, the inputs to the acoustic encoder 136 is the stack A={$a_1$, $a_2$, . . . , $a_t$} from the local prosodic component 134. The acoustic encoder 136 may encode A using a n-layer Bi-LSTM acoustic encoder to learn the audio representations. The output of the acoustic encoder 136 is the global acoustic embedding data 226, which may be a stack $$H = \{h_1^{(n)}, h_2^{(n)}, \ldots, h_t^{(n)}\}$$

of output hidden states at the last layer n computed as follows:

$$h_i^{(k)} =$$
$$W_h^{(k)}\left[\overrightarrow{LSTM}\left(h_i^{(k-1)}, \overrightarrow{h}_{i-1}^{(k)}\right); \overleftarrow{LSTM}\left(h_i^{(k-1)}, \overleftarrow{h}_{i+1}^{(k)}\right)\right] \text{ with } i \in [1, t],$$
$$\overrightarrow{h}_0^{(k)} = \vec{0}, \overleftarrow{h}_{i+1}^{(k)} = \vec{0}, \text{ and } h_i^{(0)} = \alpha_i$$

Equation (4)

where $$\overrightarrow{h}_i^{(k)} \text{ and } \overleftarrow{h}_i^{(k)}$$

are the hidden states at time frame i and layer k, which are learning from left-to-right and right-to-left, respectively.

The global prosodic component 138 may process the global acoustic embedding data 226 and the prosodic feature data 212. The global prosodic component 138 may encode the prosodic features from the entire audio stream for the spoken input and may fuse them with the outputs from the acoustic encoder 136 as described herein. The global prosodic component 138 may process as illustrated in FIG. 4.

Figure 4:
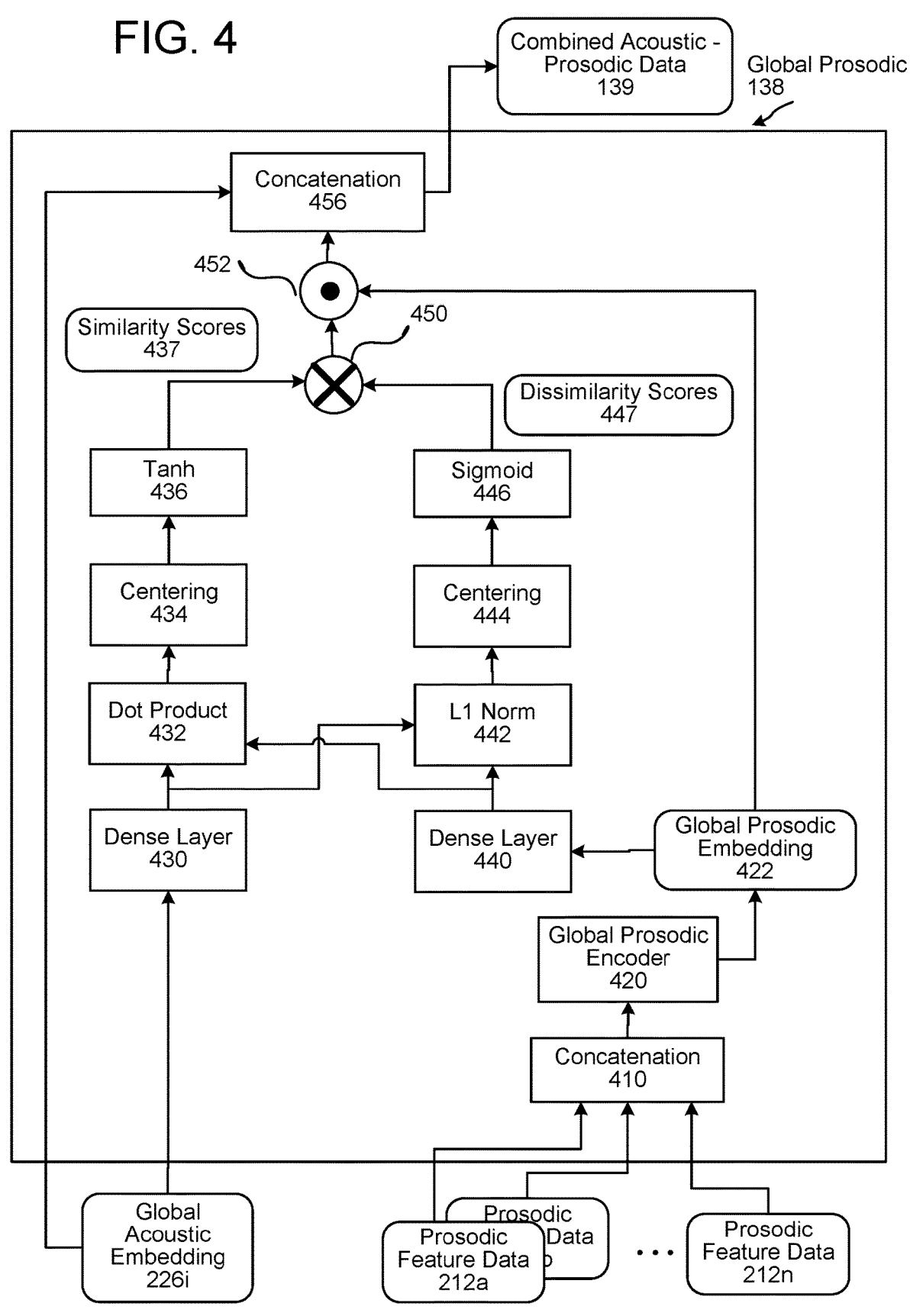
FIG. 4 is a conceptual diagram illustrating example processing performed by a global prosodic component, according to embodiments of the present disclosure.

As shown in FIG. 4, the global prosodic component 138 may include a concatenation component 410 that may concatenate/combine the individual prosodic feature data 212a-212n corresponding to the individual audio frames 202a-202n of the audio data representing the spoken input.

The global prosodic component 138 may then process the concatenated prosodic feature data using a global prosodic encoder 420. In some embodiments, the global prosodic encoder 420 may employ a 2-D convolutional neural network (CNN) model to capture global prosodic signals at varying timescales using multiple convolution filters. The output from each filter may be max-pooled, stacked, and flattened, resulting in an output feature matrix V. The global prosodic encoder 420 may output the feature matrix V as global prosodic embedding data 422.

The global prosodic component 138 may selectively fuse the global prosodic embedding data 422 (V) produced by the global prosodic encoder 420 and the global acoustic embedding data 226 produced by the acoustic encoder 136. To selectively fuse the global prosodic embedding data 422, the global prosodic component 138 may include a global prosodic gating layer that may learn (in parallel) a pair-wise similarity matrix and a pair-wise dissimilarity matrix between the global prosodic embedding data 422 and the respective global acoustic embedding data 226i. Under this dual affinity scheme, the pair-wise similarity matrix may be processed by a tanh function 436, resulting in similarity scores 437 between [−1, 1], which may control the addition and subtraction of prosodic embeddings from acoustic embeddings. The pair-wise dissimilarity matrix may be processed by a sigmoid function 446 resulting in dissimilarity scores 447 that, on the other hand, may serve as a gating mechanism that erases prosodic-acoustic similarity scores to zero when prosodic information is not relevant for SLU processing.

The global prosodic embedding data 422 (denoted by V) and the global acoustic embedding data 226 (denoted by H) may be projected into a space with the same dimension. The global prosodic component 138 may use a dense layer 430 to project each embedding $h_i \in H$ of the global acoustic embedding data 226, and may use a dense layer 440 to project each embedding $v_j \in V$ of the global prosodic embedding data 422. These projected data can be used to measure affinity matrices between H and V. Eq. (5) below shows the projected global acoustic embedding $$h_i',$$

the learnable parameter $W^h$ of the dense layer 430, the projected global prosodic embedding $$v_j',$$

and the learnable parameter $W^v$ of the dense layer 440.

$$h_i' = W^h h_i, v_j' = W^v v_j$$

Equation (5)

Next, the global prosodic component 138 may compute an affinity matrix $A^{(s)}$, which represents pair-wise similarities between H and V, where each entry $$A_{ij}^{(s)}$$

indicates a pair-wise similarity score between $h_i \in H$ and $$v_j \in V \cdot A_{ij}^{(s)}$$

may be determined by a dot product component 432 as follows:

$$A_{ij}^{(s)} = h_i' \cdot v_j'^T \qquad \text{Equation (6)}$$

The global prosodic component 138 may ensure, using a centering component 434, that $A^{(s)}$ has both positive and negative values, which encapsulates both the signal addition and subtraction. The centering component 434 may normalize $A^{(s)}$ to have a zero mean. Then, the global prosodic component 138 may apply the tanh function 436 on the output of the centering component 434 as follows, where S indicates the similarity scores 437:

$$S = \tanh[A^{(s)} - \text{mean}(A^{(s)})] \qquad \text{Equation (7)}$$

In a similar manner, the global prosodic component 138 determines, using an L1 normalization (norm) component 442, an affinity matrix $A^{(d)}$ representing pair-wise dissimilarities between H and V.

$$A_{ij}^{(d)} = -\|h_i', v_j'\|_1 \qquad \text{Equation (8)}$$

where $\|,\|_1$ indicates the $L_1$ distance between two input feature vectors. From $A^{(d)}$, the global prosodic component 138 may determine, using a sigmoid function 446, a gating matrix G (included in the dissimilarity scores 447), which acts as a mechanism to erase irrelevant global prosodic signals by:

$$G = \sigma[A^{(d)} - \text{mean}(A^{(d)})] \qquad \text{Equation (9)}$$

where $\sigma$ is the sigmoid function 446. Since $L_1$ distance (determined by the L1 norm component 442) is non-negative, $\sigma(A^{(d)}) \in [0; 0.5]$. The global prosodic component 138, using the centering component 444, may normalize $A^{(d)}$ to have a zero mean which ensures $G \in [0; 1]$.

The global prosodic component 138 may then combine the similarity scores 437 (S) and the dissimilarity scores 447 (G) using an element wise product operation 450. The global prosodic component 138 may perform a dot product operation 452 using the combined scores (S⊗G) and the global prosodic embedding data 422 to determine a portion or all of the global prosodic embedding data 422 that is relevant at a sentence/utterance level for SLU processing. In some cases, the output of the dot product operation 452 may be referred to as second prosody data. The global prosodic component 138 may then concatenate, using a concatenation component 456, the relevant portion of the global prosodic embedding 422 (the result of the dot product operator 450) with the global acoustic embedding data 226. The output of the concatenation component 456 may be the combined acoustic-prosodic data 139. In other words, the combined acoustic-prosodic data 139 may be a matrix F that is the fusion of H (the global acoustic embedding data 226) and V (the global prosodic embedding data 422) and may be generated by concatenating H with the attended V as follows:

$$F = [H; (S \otimes G)V] \qquad \text{Equation (10)}$$

In some embodiments, the global prosodic component 138 may apply a max-pooling operator on F to obtain a final representation vector f=max-pooling (F) of the input audio data, this vector f may be used by the SLU component 140 for processing.

Figure 5:
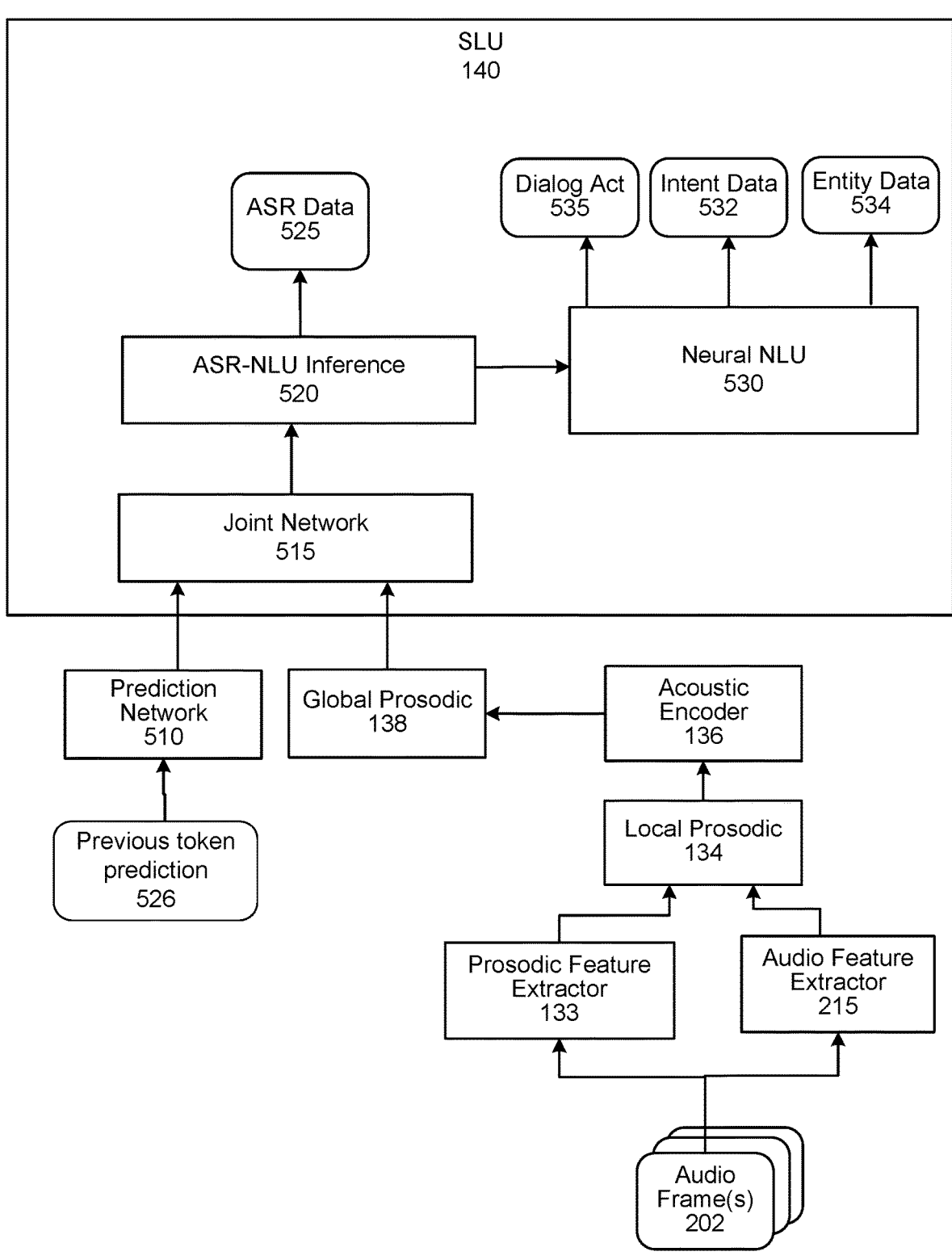
FIG. 5 is a conceptual diagram illustrating one example of how prosody data may be used by a SLU component, according to embodiments of the present disclosure.

FIG. 5 is a conceptual diagram showing example components of the SLU component 140 according to an example embodiment. The SLU component 140 may include a joint network 515, an ASR-NLU inference component 520, and a neural NLU component 530. The SLU component 140 may receive the combined acoustic-prosodic data 139, which may be determined, as described above, using the prosodic feature extractor 133, the audio feature extractor 215, the local prosodic component 134, the acoustic encoder 136, and the global prosodic component 138. The combined acoustic-prosodic data 139 may be determined using the audio frames 202 corresponding to the audio data representing the spoken input from the user 105.

The SLU component 140 may perform end-to-end (E2E) speech processing, meaning the SLU component 140 may be configured to receive input audio data related to a spoken input and process the input audio data to predict intents and entities and/or other NLU data. Thus, E2E SLU component 140 may aim to infer intents and entities from spoken audio via a single neural network. For example, when the user 105 says "order some apples", the model maps this spoken utterance (in the form of audio) to the {ShoppingIntent} and entities such as {Item: Apple}. To improve E2E SLU processing, the system 100 may be configured to incorporate prosody information into neural, recurrent and/or transformer-based models.

The example SLU component 140, shown in FIG. 5, may include an E2E SLU architecture/model, consisting of ASR and neural NLU modules jointly trained via a differentiable neural interface. The SLU component 140 may combine the prosody information with input audio features $$X^t = \{x_1^t, x_2^t, \dots, x_n^t\}$$

and then process them by an ASR model to obtain the output sequence $$y = \{y_1^{tok}, \dots, y_m^{tok}\},$$

where the outputs $$y_i^{tok.}$$

are transcription graphemes, tokens, word or subword units. In some embodiments, one or more components of the prosody determination component 132 may be trained along with the SLU architecture shown in FIG. 5.

The audio frames 202 may be sequentially fed into the prosody determination component 132. A prediction network 510 may take as input a previous token prediction 526 (which may be $$y_i^{tok.}$$

outputted by the ASR model) corresponding to a previous audio frame.

The joint network 515 may process the output of the prediction network 510 and the combined acoustic-prosodic data 139. In some embodiments, the joint network 515 may be a feedforward neural network. The output of the joint network 515 may be processed by the ASR-NLU inference component 520.

The ASR-NLU inference component 520 may output ASR data 525 representing a transcription of the spoken input. The ASR-NLU inference 520 may pass the intermediate hidden representation sequence $$H^t = \{h_1^t, h_2^t, \ldots, h_m^t\}$$

to the neural NLU component 530. The neural NLU component 530 may determine intent data 532 ($y^{int.}$) and entity data 534 representing a sequence of predicted entities, one per token, $\{y^{slot}\}$. One training objective for the SLU component is to minimize E2E SLU loss: $\mathcal{L}_{total} = \lambda_1 \mathcal{L}_{tok.} + \lambda_3 \mathcal{L}_{slot.} + \lambda_3 \mathcal{L}_{int.}$, where $\mathcal{L}_{tok.}$ is the loss for intent prediction. The intent data 532 and the entity data 534 may be included in NLU data corresponding to the spoken input. The neural NLU component 530 may also output a dialog act 535 (which may represent similar data as the dialog act 168 shown in FIG. 1B) corresponding to the spoken input, where the dialog act 535 may be one of: statement, question, backchannel, and agreement. Other dialog acts may be predicted depending on system/model configuration.

Figure 6:
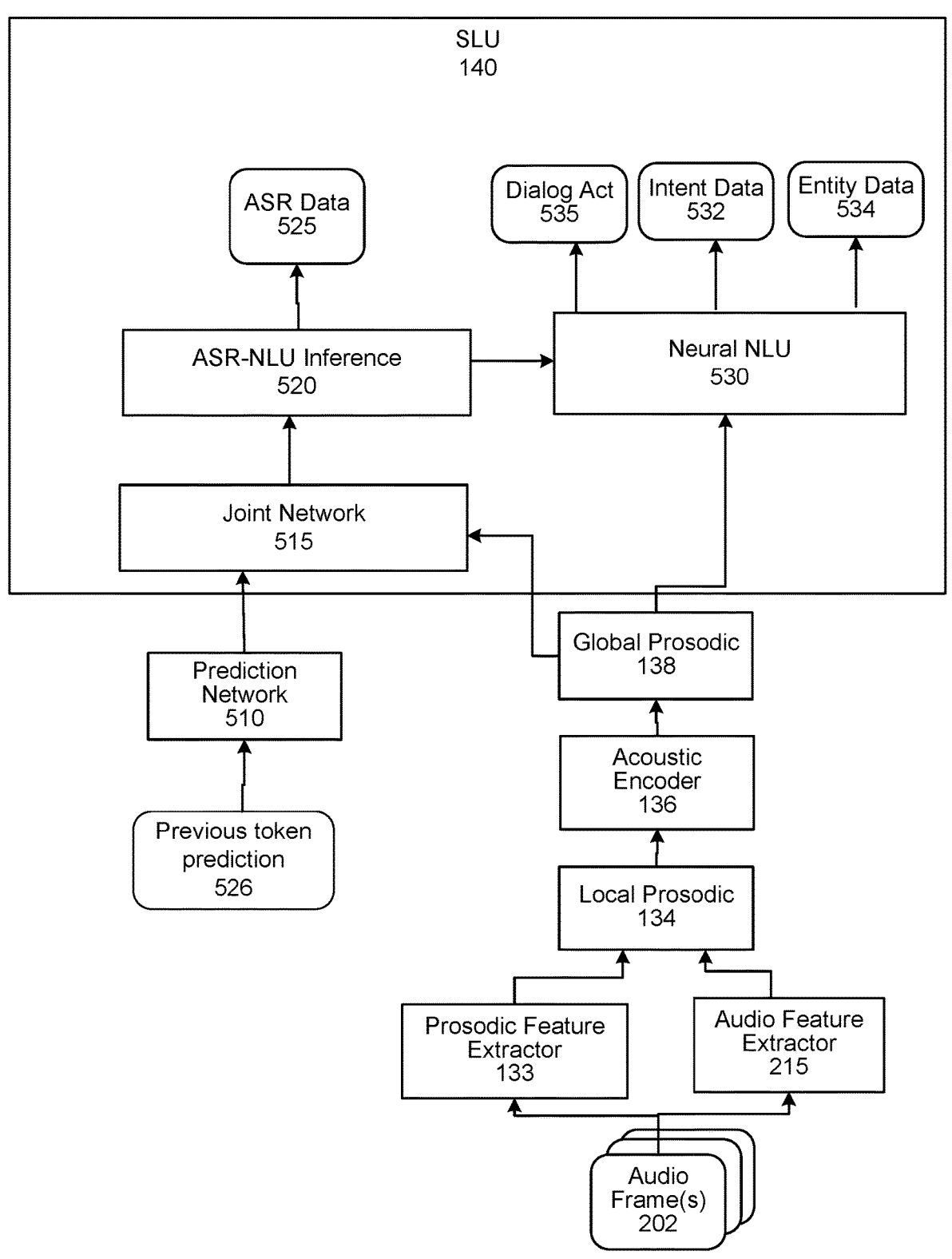
FIG. 6 is a conceptual diagram illustrating another example of how prosody data may be used by a SLU component, according to embodiments of the present disclosure.

Different embodiments may support ingestion of prosody information by the SLU component 140 in different ways. FIG. 6 is a conceptual diagram showing another example of the SLU component 140. The embodiment shown in FIG. 6 supports ingestion of prosody information by the joint network 515 and the neural NLU component 530. The combined acoustic-prosodic data 139 may be processed by the joint network 515, and can benefit the SLU component 140 in transcribing the spoken input. Additionally, the combined acoustic-prosodic data 139 may be processed by the neural NLU component 530, and can benefit the SLU component 140 in determining the intent data 532, the entity data 534 and the dialog act 535.

Figure 7:
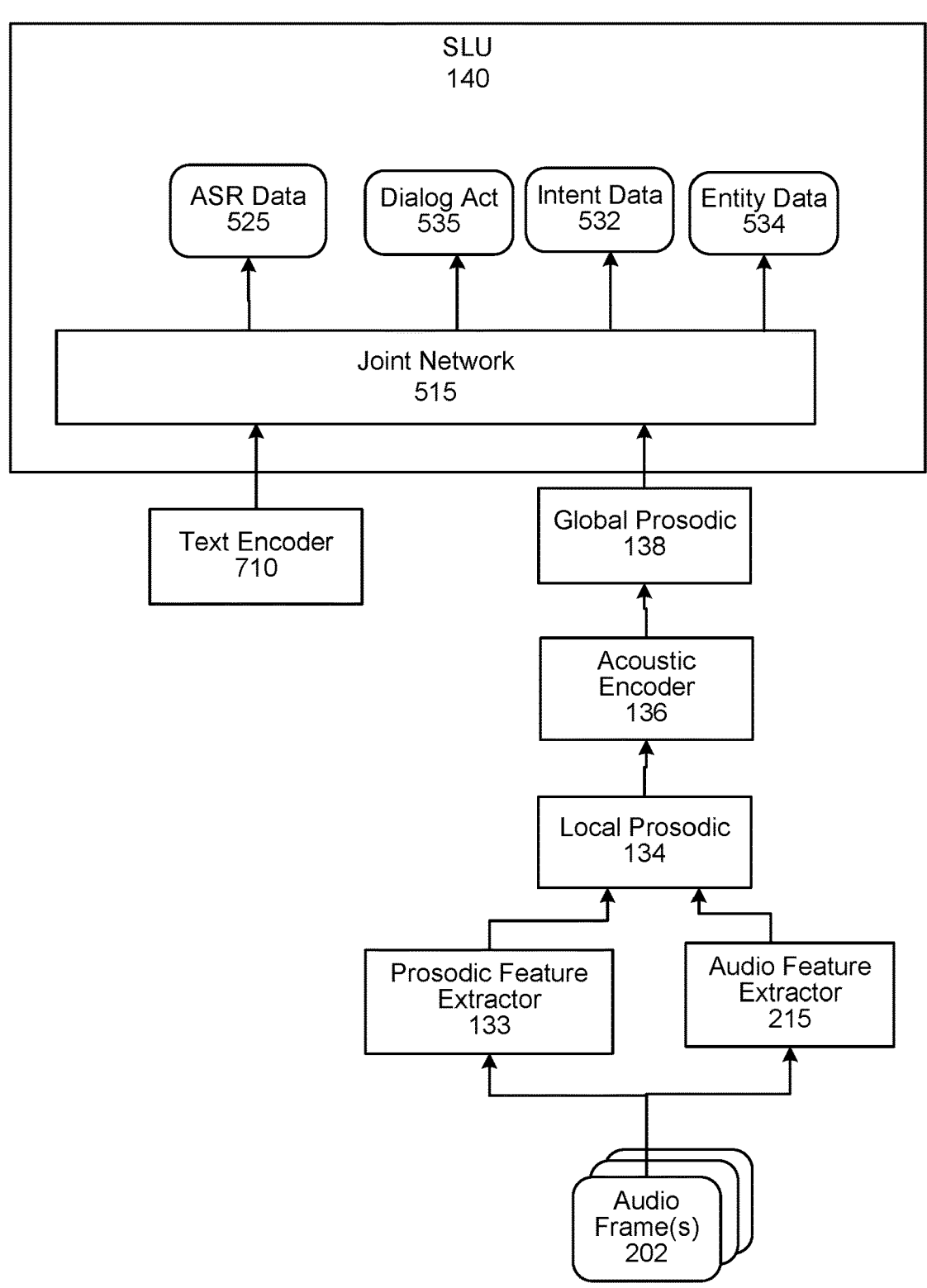
FIG. 7 is a conceptual diagram illustrating yet another example of how prosody data may be used by a SLU component, according to embodiments of the present disclosure.

FIG. 7 is a conceptual diagram showing yet another example of the SLU component 140. The embodiment shown in FIG. 7 involves use of a text encoder 710 that may encode token data or text data corresponding to the spoken input. The token/text data may be determined using one or more ASR components and by processing the audio frames 202. The joint network 515 may process the encoded token/text data and the combined acoustic-prosodic data 139, and may output the ASR data 525, the intent data 532, the entity data 534 and the dialog act 535. The ASR data 525 may be based on the prosodic information included in the combined acoustic-prosodic data 139, and may be different than the input to the text encoder 710.

In some embodiments, the SLU component 140 may take as input the audio frames 202 corresponding to input audio data representing a spoken input from the user 105. The SLU component 140 may determine input audio features corresponding to individual audio frames 202. In example embodiments, the input audio features may be 64-dimensional LFBE features extracted every 10 ms with a window size of 25 ms from the input audio data. The input audio features of each audio frame 202 may be stacked with the features of two previously occurring audio frames of the input audio data, followed by a downsampling factor of 3 to achieve a low frame rate, resulting in 192 feature dimensions per audio frame. In some embodiments, the SLU component 140 may use a token set with 4,000 wordpieces trained by a sentencepiece tokenization model.

In some embodiments, the SLU component 140 may employ Recurrent Neural Network Transducer (RNN-T) based models for the ASR-NLU inference component 520 and the neural NLU component 530. In other embodiments, the SLU component 140 may employ Transformer Transducer (T-T) based models for the ASR-NLU inference component 520 and the neural NLU component 530. The prediction network 510 may be an audio encoder network that encodes LFBE features. The ASR-NLU inference component 520 may be a prediction network that encodes a sequence of predicted wordpieces. The joint network 515 may combine the prediction network output and the previous token prediction 526. The neural NLU component 530 may predict the intent data 532, the entity data 534 and the dialog act 535. In some embodiments, the neural NLU component 530 may contain two feedforward layers before projecting into the number of intents. The neural NLU component 530 may directly take the output embeddings and project them into the entity size. One or more components of the SLU component 140 may be transformer layers, LSTM layers, bi-directional LSTM layers, and the like.

One or more machine learning training techniques may be used to configure the SLU component 140. In some embodiments, a stage-wise joint training strategy may be used. In an example embodiment, an ASR model may be first pre-trained to minimize the RNN-T model-based loss. Then the pre-trained ASR model may be frozen (e.g., weights and parameters stored for the model and not changed/updated) to train the neural NLU model to minimize the cross-entropy losses for the intent and entity predictions. During training, the training dataset may include all subwords of a word tagged with its corresponding entity. During inference/run-time, the subwords may be combined to form the word, and the entity tag for the last subword may be determined as the entity tag for the word. Lastly, the ASR and NLU models may be jointly finetuned to minimize all three losses. In some embodiments, the training techniques may involve supervised learning where the training data includes manually-annotated transcripts/text data.

Figure 8:
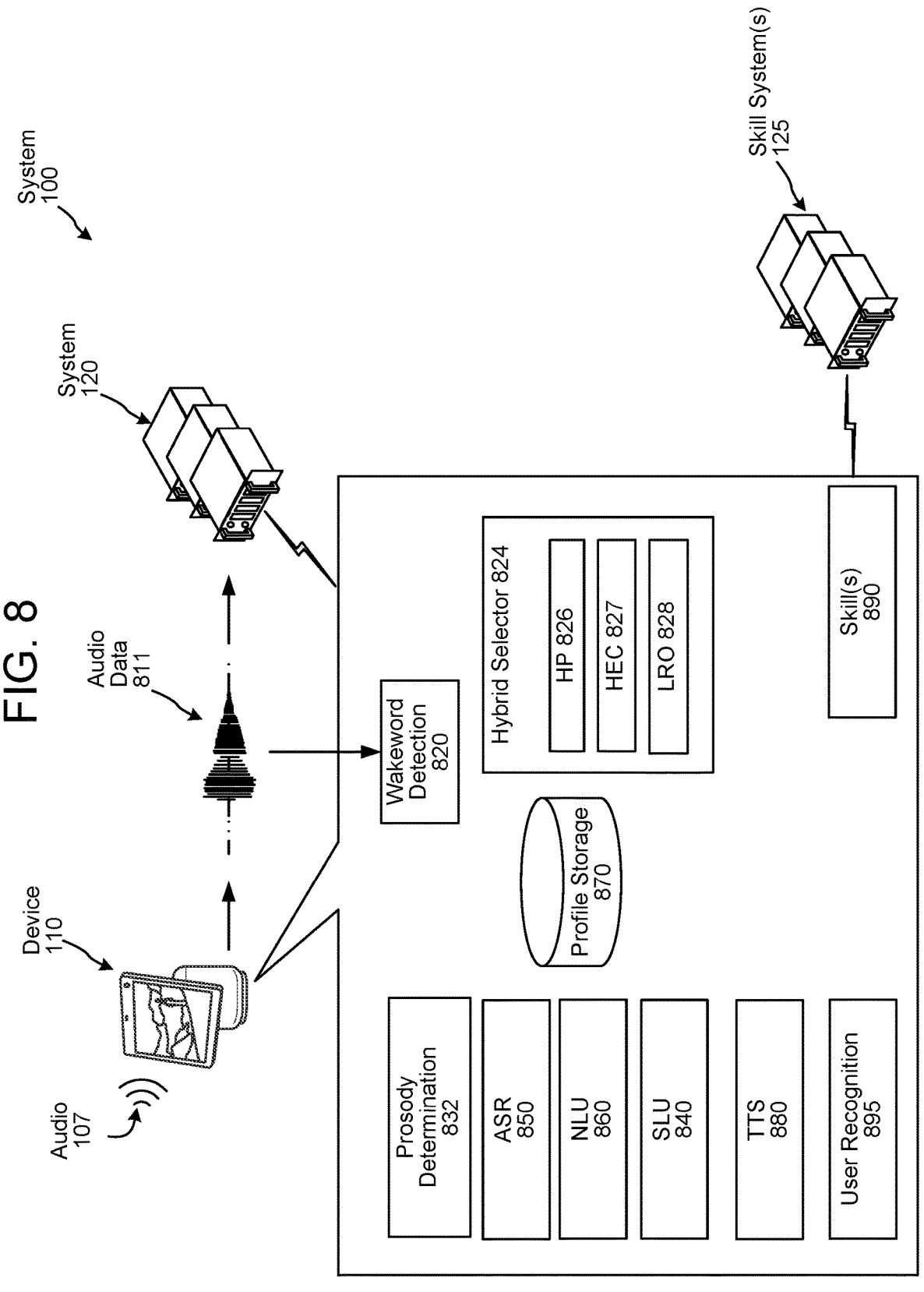
FIG. 8 is a conceptual diagram illustrating components that may be included in a device, according to embodiments of the present disclosure.

The system 100 may use other components illustrated in FIGS. 1 and 8, which are further described herein. The various components of the system 100 may be located on a same or different physical devices. Communication between various components may occur directly or across the network(s) 199.

The system 120 may perform processing to facilitate user input processing and generation of an output responsive to the user input. A microphone or array of microphones (of or otherwise associated with the device 110) may capture audio. The device 110 processes audio data, representing the audio, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data, the energy levels of the audio data in one or more spectral bands, the signal-to-noise ratios of the audio data in one or more spectral bands, or other quantitative aspects. In other examples, the device 110 may implement a classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data, the device 110 may determine if the speech is directed at the device 110/system 120. In at least some embodiments, such determination may be made using a wakeword detection component 820 (shown in FIG. 8). The wakeword detection component 820 may be configured to detect various wakewords. In at least some examples, each wakeword may correspond to a name of a different digital assistant. An example wakeword/digital assistant name is "Alexa."

Wakeword detection is typically performed without performing linguistic analysis, textual analysis, or semantic analysis. Instead, the audio data is analyzed to determine if specific characteristics of the audio data match preconfigured acoustic waveforms, audio signatures, or other data corresponding to a wakeword.

Thus, the wakeword detection component 820 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid deep neural network (DNN)-HMM decoding framework. In another example, the wakeword detection component 820 may be built on DNN/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

In various embodiments, the device 110 may behave differently depending on which wakeword is used. For example, in a multi-user environment, different users may use different wakewords, and the device 110 may tailor its operation in response to a particular user/wakeword matching. The device 110 may, for example, access a user profile associated with a particular wakeword and load device preferences or device usage history stored in the user profile. In other embodiments, a first wakeword may be associated with a first mode of operation of the device 110 and a second wakeword may be associated with a second mode of operation of the device 110. The first mode of operation may be, for example, a personal assistant, and the second mode of operation may be navigation (such as automobile navigation).

In another example the device 110 may be configured to process commands associated with a first wakeword using a different set of components than commands associated with a second wakeword. For example, if an utterance includes the wakeword "Alexa," audio data for that wakeword may be sent to a first speech processing system for speech processing and/or command execution. If an utterance includes the wakeword "Ok Google," audio data for that wakeword may be sent to a second speech processing system for speech processing and/or command execution. In another example the system may also use different wakewords for different skills within a same speech processing system. For example, a user may speak "Ford" as a special wakeword to invoke a specific skill or processing pipeline within a first speech processing system (e.g., a speech processing system that may otherwise be invoked by speaking "Alexa"). Use of the special "Ford" wakeword may result in different routing of the utterance through the first speech processing system than use of a standard wakeword such as "Alexa." Thus the device 110 using the techniques described herein may process incoming audio to determine a first confidence that a detected wakeword is a first wakeword associated with a first speech processing pipeline (which may be a first speech processing system or a first pipeline (e.g., skill, etc.) within the first speech processing system) as well as determine a second confidence that the detected wakeword is a second wakeword associated with a second speech processing pipeline (which may be a second speech processing system or a second, different, pipeline (e.g., skill, etc.) within the second speech processing system. The different systems/pipelines may be associated with different ASR processing, different NLU processing, different commands/intents, or other differences.

Once the wakeword detection component 820 detects a wakeword, the device 110 may "wake" and begin transmitting audio data 811, representing the audio, to the system 120. The audio data 811 may include the detected wakeword, or the device 110 may remove the portion of the audio data, corresponding to the detected wakeword, prior to sending the audio data 811 to the system 120.

The foregoing describes illustrative components and processing of the system 120. The following describes illustrative components and processing of the device 110. As illustrated in FIG. 8, in at least some embodiments the system 120 may receive audio data 811 from the device 110, to recognize speech corresponding to a spoken natural language in the received audio data 811, and to perform functions in response to the recognized speech. In at least some embodiments, these functions involve sending directives (e.g., commands), from the system 120 to the device 110 to cause the device 110 to perform an action, such as output synthesized speech (responsive to the spoken natural language input) via a loudspeaker(s), and/or control one or more secondary devices by sending control commands to the one or more secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output synthesized speech via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It will be appreciated that the system 120 may be configured to provide other functions in addition to those discussed herein, such as, without limitation, providing step-by-step directions for navigating from an origin location to a destination location, conducting an electronic commerce transaction on behalf of the user 105 as part of a shopping function, establishing a communication session (e.g., an audio or video call) between the user 105 and another user, and so on.

The device 110 may include a wakeword detection component 820 configured to detect a wakeword (e.g., "Alexa") that indicates to the device 110 that the audio data 811 is to be processed for determining NLU output data. In at least some embodiments, a hybrid selector 824, of the device 110, may send the audio data 811 to the wakeword detection component 820. If the wakeword detection component 820 detects a wakeword in the audio data 811, the wakeword detection component 820 may send an indication of such detection to the hybrid selector 824. In response to receiving the indication, the hybrid selector 824 may send the audio data 811 to the system 120 and/or an on-device ASR component 850. The wakeword detection component 820 may also send an indication, to the hybrid selector 824, representing a wakeword was not detected. In response to receiving such an indication, the hybrid selector 824 may refrain from sending the audio data 811 to the system 120, and may prevent the ASR component 850 from processing the audio data 811. In this situation, the audio data 811 can be discarded.

The device 110 may conduct its own speech processing using on-device language processing components (such as an on-device SLU component 840, an on-device ASR component 850, and/or an on-device NLU component) similar to the manner discussed above with respect to the system-implemented SLU component 140, the system-implemented ASR component, and the system-implemented NLU component. The device 110 may also internally include, or otherwise have access to, other components such as one or more skills 890 (which may process similar to the skill components 190), a user recognition component 895 (configured to process in a similar manner to the system-implemented user recognition component 195), profile storage 870 (configured to store similar profile data to the system-implemented profile storage 170), a TTS component 880 (configured to process in a similar manner to the system-implemented TTS component 180), and other components. One or more of the components may be customized/personalized for a user (or group of users) of the device 110. In at least some embodiments, the on-device profile storage 870 may only store profile data for a user or group of users specifically associated with the device 110. The device 110 may also include a prosody determination component 832 that may be configured to process in a similar manner as the prosody determination component 132.

The device 110 may also include a dialog act classifier that may be configured to perform operations similar to the dialog act classifier 165, and may be personalized for the user 105 of the device 110.

In at least some embodiments, the on-device language processing components may not have the same capabilities as the language processing components implemented by the system 120. For example, the on-device language processing components may be configured to handle only a subset of the natural language inputs that may be handled by the speech processing system-implemented language processing components. For example, such subset of natural language inputs may correspond to local-type natural language inputs, such as those controlling devices or components associated with a user's home. In such circumstances the on-device language processing components may be able to more quickly interpret and respond to a local-type natural language input, for example, than processing that involves the system 120. If the device 110 attempts to process a natural language input for which the on-device language processing components are not necessarily best suited, the NLU output data, determined by the on-device components, may have a low confidence or other metric indicating that the processing by the on-device language processing components may not be as accurate as the processing done by the system 120.

The hybrid selector 824, of the device 110, may include a hybrid proxy (HP) 826 configured to proxy traffic to/from the system 120. For example, the HP 826 may be configured to send messages to/from a hybrid execution controller (HEC) 827 of the hybrid selector 824. For example, command/directive data received from the system 120 can be sent to the HEC 827 using the HP 826. The HP 826 may also be configured to allow the audio data 811 to pass to the system 120 while also receiving (e.g., intercepting) this audio data 811 and sending the audio data 811 to the HEC 827.

In at least some embodiments, the hybrid selector 824 may further include a local request orchestrator (LRO) 828 configured to notify the ASR component 850 about the availability of the audio data 811, and to otherwise initiate the operations of on-device language processing when the audio data 811 becomes available. In general, the hybrid selector 824 may control execution of on-device language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system 120 and chooses to use that remotely-determined directive data.

Thus, when the audio data 811 is received, the HP 826 may allow the audio data 811 to pass through to the system 120 and the HP 826 may also input the audio data 811 to the ASR component 850 by routing the audio data 811 through the HEC 827 of the hybrid selector 824, whereby the LRO 828 notifies the ASR component 850 of the audio data 811. At this point, the hybrid selector 824 may wait for response data from either or both the system 120 and/or the on-device language processing components. However, the disclosure is not limited thereto, and in some examples the hybrid selector 824 may send the audio data 811 only to the ASR component 850 without departing from the disclosure. For example, the device 110 may process the audio data 811 on-device without sending the audio data 811 to the system 120.

The ASR component 850 is configured to receive the audio data 811 from the hybrid selector 824, and to recognize speech in the audio data 811, and the on-device NLU component is configured to determine an intent from the recognized speech (an optionally one or more named entities), and to determine how to act on the intent by generating NLU output data that may include directive data (e.g., instructing a component to perform an action). In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

A NLU hypothesis (output by the on-device NLU component) may be selected as usable to respond to a natural language input, and local response data may be sent (e.g., local NLU output data, local knowledge base information, internet search results, and/or local directive data) to the hybrid selector 824, such as a "ReadyToExecute" response. The hybrid selector 824 may then determine whether to use directive data from the on-device components to respond to the natural language input, to use directive data received from the system 120, assuming a remote response is even received (e.g., when the device 110 is able to access the system 120 over the network(s) 199), or to determine output data requesting additional information from the user 105.

The device 110 and/or the system 120 may associate a unique identifier with each natural language input. The device 110 may include the unique identifier when sending the audio data 811 to the system 120, and the response data from the system 120 may include the unique identifier to identify to which natural language input the response data corresponds.

In at least some embodiments, the device 110 may include one or more skill components 190. The skill component(s) 190 installed on (or in communication with) the device 110 may include, without limitation, a smart home skill and/or a device control skill configured to control a second device(s), a music skill configured to output music, a navigation skill configured to output directions, a shopping skill configured to conduct an electronic purchase, and/or the like.

One or more of the components described herein may employ a machine learning (ML) model(s). Generally, ML models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognition patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning model requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 9:
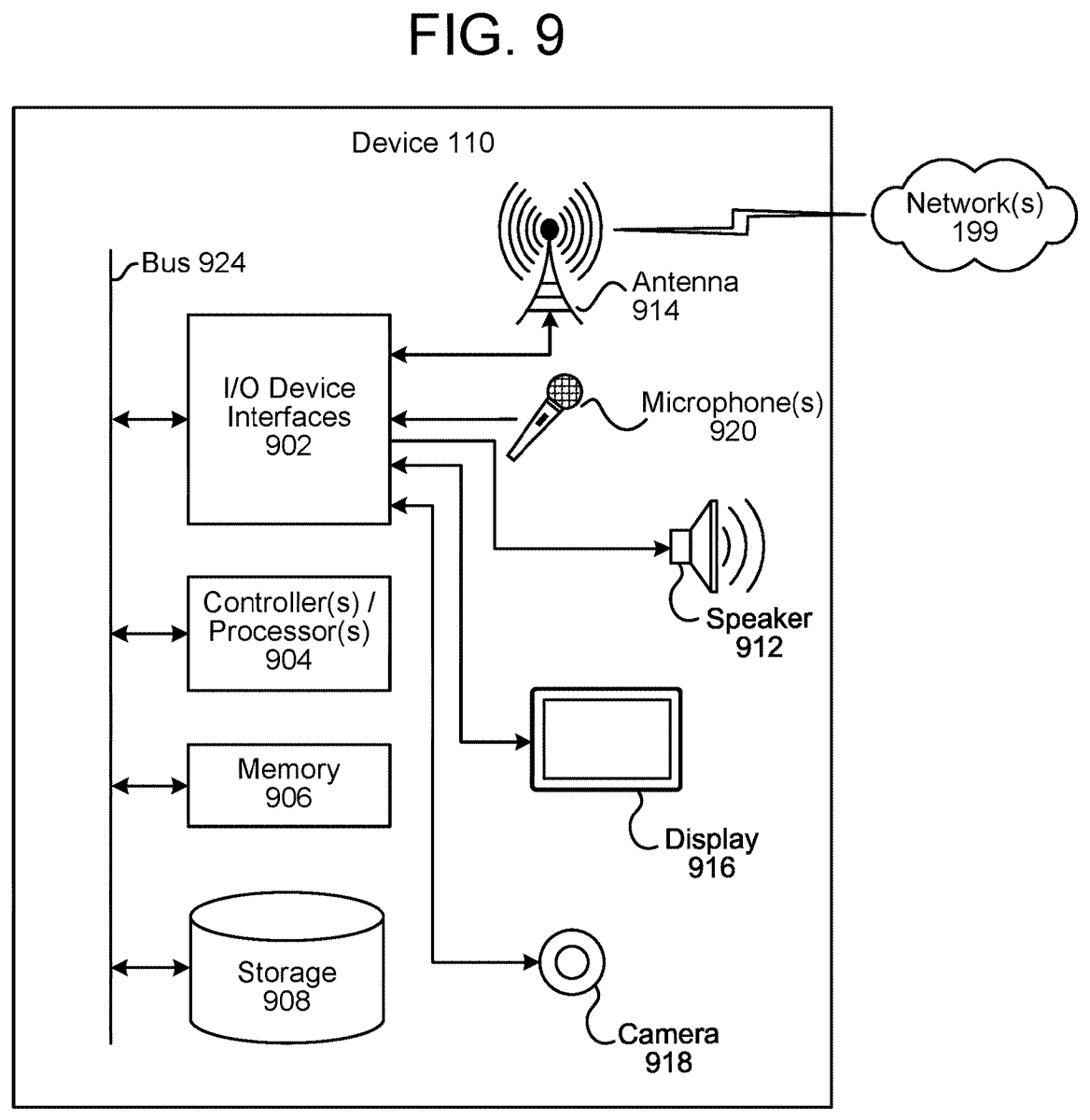
Figure 10:
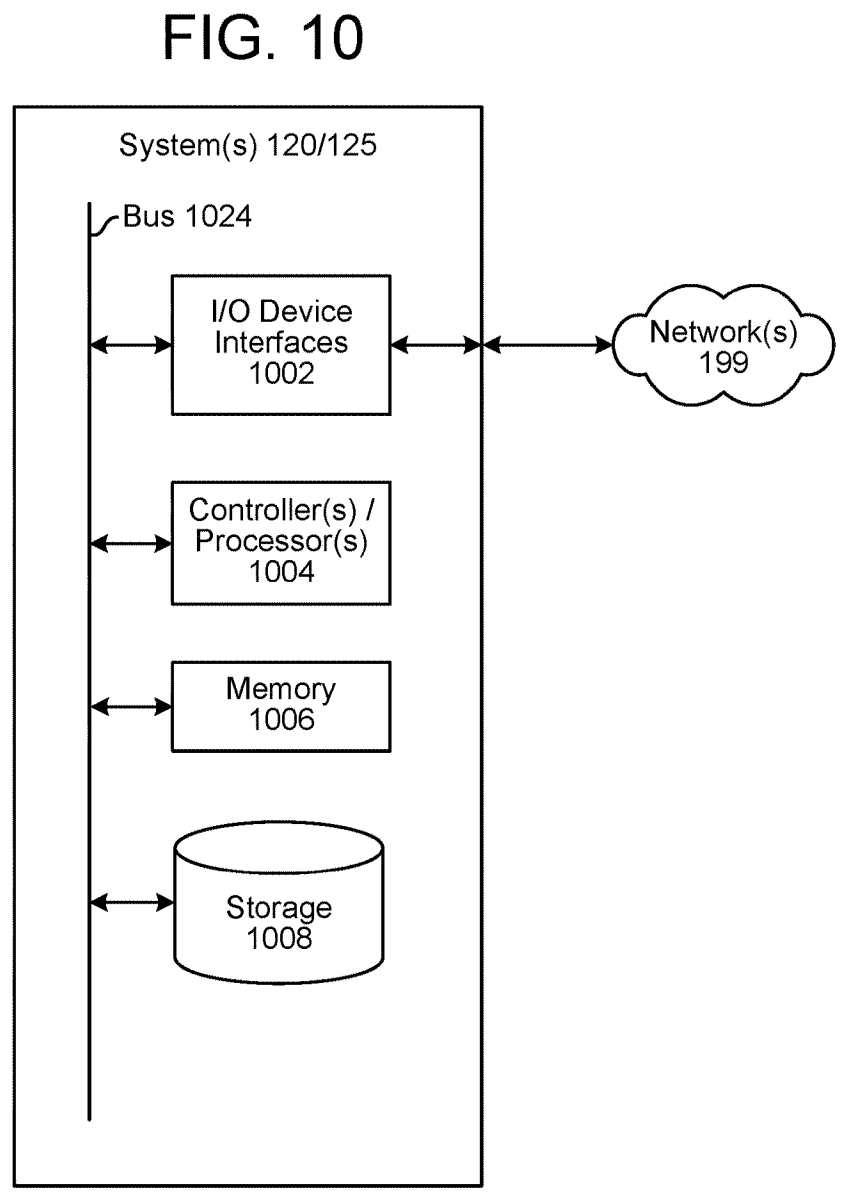

FIG. 9 is a block diagram conceptually illustrating a device 110 of the system 100. FIG. 10 is a block diagram conceptually illustrating example components of a system, such as the system 120 and the skill(s) system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system (120/125) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the system 100 of the present disclosure, such as, one or more systems 120 and/or one or more skills 125. In operation, each of these systems may include computer-readable and computer-executable instructions that reside on the respective device (120/125), as will be discussed further below.

Each of these devices (110/120/125) may include one or more controllers/processors (904/1004), which may each include a central processing unit (CPU) for processing data and computer-readable instructions, and a memory (906/1006) for storing data and instructions of the respective device. The memories (906/1006) may individually include volatile random access memory (RAM), non-volatile read only memory (ROM), non-volatile magnetoresistive memory (MRAM), and/or other types of memory. Each device (110/120/125) may also include a data storage component (908/1008) for storing data and controller/processor-executable instructions. Each data storage component (908/1008) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (902/1002).

Computer instructions for operating each device (110/120/125) and its various components may be executed by the respective device's controller(s)/processor(s) (904/1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

Each device (110/120/125) includes input/output device interfaces (902/1002). A variety of components may be connected through the input/output device interfaces (902/

1002), as will be discussed further below. Additionally, each device (110/120/125) may include an address/data bus (924/1024) for conveying data among components of the respective device. Each component within a device (110/120/125) may also be directly connected to other components in addition to (or instead of) being connected to other components across the bus (924/1024).

Referring to FIG. 9, the device 110 may include input/output device interfaces 902 that connect to a variety of components such as an audio output component such as a speaker 912, a wired headset or a wireless headset (not illustrated), or other component capable of outputting audio. The device 110 may also include an audio capture component. The audio capture component may be, for example, a microphone 920 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 916 for displaying content. The device 110 may further include a camera 918.

Via antenna(s) 914, the input/output device interfaces 902 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (902/1002) may also include communication components that allow data to be exchanged between devices such as different physical servers in a collection of servers or other components.

The components of the device 110, the system 120 and/or skill 125 may include their own dedicated processors, memory, and/or storage. Alternatively, one or more of the components of the device 110, the system 120 and/or skill 125 may utilize the I/O interfaces (902/1002), processor(s) (904/1004), memory (906/1006), and/or storage (908/1008) of the device 110, the system 120 and/or skill 125, respectively.

As noted above, multiple devices may be employed in a single system. In such a multi-device system, each of the devices may include different components for performing different aspects of the system's processing. The multiple devices may include overlapping components. The components of the device 110, the system 120 and the skill system 125, as described herein, are illustrative, and may be located as a stand-alone device or may be included, in whole or in part, as a component of a larger device or system.

As illustrated in FIG. 11, multiple devices (110a-110j, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-controllable device 110a, a smart phone 110b, a smart watch 110c, a tablet computer 110d, a vehicle 110e, a speech-controllable display device 110f, a smart television 110g, a washer/dryer 110h, a refrigerator 110i, and/or a microwave 110j may be connected to the network(s) 199 through a wireless service provider, over a Wi-Fi or cellular network connection, or the like. Other devices are included as network-connected support devices, such as the system 120, the skill 125, and/or others. The support devices may connect to the network(s) 199 through a wired connection or wireless connection.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving input audio data representing a spoken input;
determining a plurality of audio frames corresponding to the input audio data;
determining local prosody data representing prosodic features at an audio frame level, the local prosody data including at least first prosody data corresponding to a first audio frame of the plurality of audio frames;
determining, using the plurality of audio frames, a plurality of audio features including at least first audio feature data corresponding to the first audio frame;
determining, using the first prosody data and the first audio feature data, a first portion of the first prosody data relevant for the first audio frame;
determining, using the first portion of the first prosody data and the first audio feature data, first acoustic embedding data corresponding to the first audio frame;
processing, using a prosody encoder, the local prosody data to determine prosodic embedding data;
determining, using the first acoustic embedding data and the prosodic embedding data, a first portion of the prosodic embedding data relevant for the input audio data;
determining, using the first portion of the prosodic embedding data and the first acoustic embedding data, combined audio-prosodic data; and
determining, using the combined audio-prosodic data, an intent corresponding to the spoken input.

2. The computer-implemented method of claim 1, further comprising:
determining, using the local prosody data and the plurality of audio features, second acoustic embedding data corresponding to the input audio data;
determining similarity data representing similarities between the prosodic embedding data and the second acoustic embedding data;
determining dissimilarity data representing dissimilarities between the prosodic embedding data and the second acoustic embedding data;
determining, based on a combination of the similarity data and the dissimilarity data, first data; and
determining, using the first data and the prosodic embedding data, the first portion of the prosodic embedding data relevant for the input audio data.

3. The computer-implemented method of claim 1, further comprising:
processing, using a joint network, the combined audio-prosodic data and first data corresponding to the input audio data to determine second data;
processing, using a first neural machine learning model, the second data to determine third data representing an output of a layer of the first neural machine learning model; and
processing, using a second neural machine learning model, the third data to determine natural language understanding (NLU) data corresponding to the spoken input, the NLU data including the intent and an entity.

4. The computer-implemented method of claim 1, further comprising:

processing, using a joint network, the combined audio-prosodic data and first data corresponding to the input audio data to determine second data;
processing, using a first neural machine learning model, the second data to determine third data representing an output of a layer of the first neural machine learning model; and
processing, using a second neural machine learning model, the combined audio-prosodic data and the third data to determine NLU data corresponding to the spoken input, the NLU data including the intent and an entity.

5. A computer-implemented method, comprising:
receiving input audio data representing a spoken input;
processing the input audio data to determine first data representing one or more prosodic features corresponding to at least a portion of the spoken input and second data representing one or more acoustic features corresponding to at least the portion of the spoken input;
using at least a first portion of the first data and at least a second portion of the second data to determine a data vector representing both the first portion of the first data and the second portion of the second data;
providing the data vector to an input layer of a neural network; and
processing the data vector using the neural network to determine output data representing a semantic interpretation of the spoken input.

6. The computer-implemented method of claim 5, wherein processing the first data and the second data further comprises:
determining, using the first data and the second data, a first gating score; and
determining, using the first gating score and the first data, that the first portion of the first data is to be used to determine the semantic interpretation.

7. The computer-implemented method of claim 6, further comprising:
determining, using the first portion of the first data and the second data, first local acoustic embedding data;
processing, using an acoustic encoder, the first local acoustic embedding data to determine first global acoustic embedding data; and
determining the semantic interpretation based at least in part on the first global acoustic embedding data.

8. The computer-implemented method of claim 5, further comprising:
determining first prosody feature data corresponding to a first audio frame of the input audio data;
determining second prosody feature data corresponding to a second audio frame of the input audio data;
determining, using at least the first prosody feature data and the second prosody feature data, combined prosody data; and
processing, using a prosody encoder, the combined prosody data to determine the first data.

9. The computer-implemented method of claim 5, further comprising:
using a prosody encoder to process prosodic feature data to determine the first data;
determining, using the prosodic feature data and audio feature data corresponding to the input audio data, the second data;
determining similarity data representing similarities between the first data and the second data;
determining dissimilarity data representing dissimilarities between the first data and the second data;

determining, based on a combination of the similarity data and the dissimilarity data, third data; and determining, using the third data and the first data, that the first portion of the first data is to be used to determine the semantic interpretation.

10. The computer-implemented method of claim 5, wherein processing the data vector using the neural network further comprises:

processing at least the first portion of the first data and the second portion of the second data to determine natural language understanding (NLU) data corresponding to the spoken input, the NLU data representing an intent and an entity.

11. A system comprising:

at least one processor; and at least one memory including instructions that, when executed by the at least one processor, cause the system to:

receive input audio data representing a spoken input;

process the input audio data to determine first data representing one or more prosodic features corresponding to at least a portion of the spoken input and second data representing one or more acoustic features corresponding to at least the portion of the spoken input;

use at least a first portion of the first data and at least a second portion of the second data to determine a data vector representing both the first portion of the first data and the second portion of the second data;

provide the data vector to an input layer of a neural network; and process the data vector using the neural network to determine output data representing a semantic interpretation of the spoken input.

12. The system of claim 11, wherein the at least one memory includes further instructions that, when executed by the at least one processor, further cause the system to process the first data and the second data at least in part by:

determine, using the first data and the second data, a first gating score; and determine, using the first gating score and the first data, that the first portion is to be used to determine the semantic interpretation.

13. The system of claim 12, wherein the at least one memory includes further instructions that, when executed by the at least one processor, further cause the system to:

determine, using the first portion of the first data and the second data, first local acoustic embedding data;

process, using an acoustic encoder, the first local acoustic embedding data to determine first global acoustic embedding data; and determine the semantic interpretation based at least in part on the first global acoustic embedding data.

14. The system of claim 11, wherein the at least one memory includes further instructions that, when executed by the at least one processor, further cause the system to:

determine first prosody feature data corresponding to a first audio frame of the input audio data;

determine second prosody feature data corresponding to a second audio frame of the input audio data;

determine, using at least the first prosody feature data and the second prosody feature data, combined prosody data; and process, using a prosody encoder, the combined prosody data to determine the first data.

15. The system of claim 11, wherein the at least one memory includes further instructions that, when executed by the at least one processor, further cause the system to:

use a prosody encoder to process prosodic feature data to determine the first data;

determine, using the prosodic feature data and audio feature data corresponding to the input audio data, the second data;

determine similarity data representing similarities between the first data and the second data;

determine dissimilarity data representing dissimilarities between the first data and the second data;

determine, based on a combination of the similarity data and the dissimilarity data, third data; and determine, using the third data and the first data, that the first portion of the first data is to be used to determine the semantic interpretation.

16. The system of claim 11, wherein the at least one memory includes further instructions that, when executed by the at least one processor, further cause the system to process the data vector using the neural network at least in part by:

processing at least the first portion of the first data and the second portion of the second data to determine natural language understanding (NLU) data corresponding to the spoken input, the NLU data representing an intent and an entity.

* * * * *